(12) United States Patent
Rouland et al.

(10) Patent No.: US 11,757,724 B1
(45) Date of Patent: Sep. 12, 2023

(54) IDENTIFYING DEVICES ON A NETWORK WITH MINIMAL IMPACT TO THE NETWORK

(71) Applicant: Phosphorus Cybersecurity Inc., Nashville, TN (US)

(72) Inventors: Christopher Jay Rouland, Nashville, TN (US); Justin Trent Altman, Carlsbad, CA (US); Earle W. Ady, Jackson, WY (US); Jeremy Lindsey Gould, San Bruno, CA (US); Joseph Willard Costantini, Nashville, TN (US)

(73) Assignee: Phosphorus Cybersecurity Inc., Nashville, TN (US)

( * ) Notice: Subject to any disclaimer, the term of this patent is extended or adjusted under 35 U.S.C. 154(b) by 0 days.

(21) Appl. No.: 17/987,585

(22) Filed: Nov. 15, 2022

(51) Int. Cl.
*H04L 41/12* (2022.01)
*H04L 43/12* (2022.01)
*H04L 41/06* (2022.01)

(52) U.S. Cl.
CPC .............. *H04L 41/12* (2013.01); *H04L 41/06* (2013.01); *H04L 43/12* (2013.01)

(58) Field of Classification Search
CPC ............. H04L 41/12–122; H04L 41/34; H04L 41/342; H04L 41/344; H04L 41/40; H04L 43/10–12
See application file for complete search history.

(56) References Cited

U.S. PATENT DOCUMENTS

| | | | |
|---|---|---|---|
| 7,912,934 B1* | 3/2011 | Melton | H04L 41/0893 709/227 |
| 9,647,875 B1* | 5/2017 | Lambert | H04L 41/12 |
| 10,944,638 B1* | 3/2021 | Chamarajnager | H04L 41/046 |
| 2003/0126617 A1* | 7/2003 | Tewari | H04L 41/12 709/224 |
| 2006/0248233 A1* | 11/2006 | Park | H04L 41/12 709/249 |
| 2013/0060932 A1* | 3/2013 | Ofek | H04L 41/12 709/224 |
| 2017/0310547 A1* | 10/2017 | Lin | H04L 41/0853 |
| 2020/0213200 A1* | 7/2020 | Ranganathan | H04L 41/12 |

* cited by examiner

*Primary Examiner* — Brendan Y Higa
(74) *Attorney, Agent, or Firm* — MORRISON & FOERSTER LLP

(57) ABSTRACT

A method for identifying devices on a network, comprising: determining, by a discovery application, a prioritized discovery plan including a plurality of tiers of requests, each of the tiers specifying one or more probes for targeting specific types of devices. For each of the tiers in the prioritized discovery plan: the method further comprises causing, by the discovery application, one or more of the probes specified for the tier to transmit targeted requests to a set of active addresses on the network. Upon receiving responses from at least a subset of the one or more addresses, the method comprises identifying, by the discovery application, one or more devices connected to the network based on the responses to the targeted requests. The method further comprises removing, by the discovery application, addresses corresponding to the identified one or more devices from the set of active addresses on the network.

20 Claims, 13 Drawing Sheets

IDENTIFYING DEVICES ON A NETWORK WITH MINIMAL IMPACT TO THE NETWORK

TECHNICAL FIELD

This disclosure generally relates to device identification.

BACKGROUND

Continued technological advancements have resulted in substantial expansions to both the Internet of Things (IoT) and Operational Technology (OT) ecosystems. Although the advances have provided many benefits such as increased productivity and safety, the increase in IoT and OT devices also introduce a similar increase in the vulnerability of various systems due to potential security flaws. Consequently, new security challenges arise for both consumer and industrial level applications. Device discovery and profiling may help support the much-needed protection of these networks and the corresponding devices. However, passive scanning approaches may not discover all devices, but active scan-and-probe approaches may place undue burden on a network.

SUMMARY

The present disclosure presents a method to identify all discoverable devices connected to a network by using lightweight probes in a strategic approach designed to limit the impact that the discovery process imposes on the network. The probes may be organized into a tiered structure designed to minimize the overall number of packets and/or the number of bytes required to complete the discovery process for all of the responsive devices, to minimize the number of packets and/or the number of bytes being transmitted at any given time, and to avoid overwhelming fragile devices. For example, a first tier of probes may broadcast to all IP addresses within the network before corresponding responses for those probes are received and processed. A second tier of probes may then be transmitted, with another set of corresponding responses subsequently received and processed. The second tier of probes may also be influenced by the responses for the first tier of probes. This process may then be repeated as appropriate to include many more tiers of probes.

In various embodiments, a method for identifying devices on a network includes determining, by a discovery application executing on a computer, a prioritized discovery plan including a plurality of tiers of requests, each of the tiers specifying one or more probes for targeting specific types of devices, wherein the prioritized discovery plan further includes transmission settings. For each of the tiers in the prioritized discovery plan: the method further includes causing, by the discovery application, one or more of the probes specified for the tier to transmit targeted requests to a set of active addresses on the network. Upon receiving responses from at least a subset of the one or more addresses, the method further includes identifying, by the discovery application, one or more devices connected to the network based on the responses to the targeted requests. The method further includes removing, by the discovery application, addresses corresponding to the identified one or more devices from the set of active addresses on the network.

Optionally, identifying the one or more devices includes determining a set of device profiles based on the probes specified for the tier, parsing data from the responses to the targeted requests, and comparing the parsed data to identifying information in the device profiles, wherein the one or more devices are identified based on the comparison.

Optionally, determining the prioritized discovery plan is based on user input specifying a network ID, one or more protocols, one or more ports for each of the protocols, one or more probes, information related to the transmission settings, device recognition settings, or a network context.

Optionally, the prioritized discovery plan includes a first tier of broadcast requests for discovering active addresses on the network, and the method further includes: broadcasting, in accordance with the prioritized discovery plan, requests to all candidate addresses on the network, and determining, based on one or more responses received from at least a subset of the addresses, the set of active addresses on the network.

Optionally, the prioritized discovery plan specifies that the one or more probes transmit the targeted requests corresponding to later tiers of the one or more successive tiers using less common communication protocols or to less common port numbers.

Optionally, the prioritized discovery plan defers execution of one or more of the probes that are classified as resource-intensive to later tiers of the one or more successive tiers.

Optionally, the method further includes determining, based on responses received for at least one previous tier of requests, that a device connected to the network is fragile or excluded, and removing an address corresponding to the fragile or excluded device from the set of active addresses.

Optionally, at least one of the one or more tiers of requests are transmitted in accordance with transmission settings configured for the tier or for one of the probes specified for the tier, wherein the transmission settings for the tier are configured to maximize speed of discovery while avoiding triggering alerts, or wherein the transmission settings for the probe are configured to maximize speed of discovery while avoiding device faults.

Optionally, at least one of the successive tiers of requests is dynamically updated based on responses received for at least one previous tier of requests.

Optionally, identifying the devices includes extracting identifying information on the one or more devices from the responses to the targeted requests.

Optionally, the transmission settings include a time threshold for resending a request or a maximum number of times to resend a request.

Optionally, the one or more probes includes at least one third-party probe conforming to an interface associated with the discovery application.

In various embodiments, a system includes one or more processors and a memory coupled to the processors including instructions executable by the processors for identifying devices on a network, the processors being operable when executing the instructions to determine, by a discovery application, a prioritized discovery plan including a plurality of tiers of requests, each of the tiers specifying one or more probes for targeting specific types of devices, wherein the prioritized discovery plan further includes transmission settings. For each of the tiers in the prioritized discovery plan, the processors are further operable when executing the instructions to cause, by the discovery application, one or more of the probes specified for the tier to transmit targeted requests to a set of active addresses on the network. Upon receiving responses from at least a subset of the one or more addresses, the processors are further operable when executing the instructions to identify, by the discovery application, one or more devices connected to the network based on the responses to the targeted requests. The processors are further operable when executing the instructions to remove, by the discovery application, addresses corresponding to the identified one or more devices from the set of active addresses on the network.

Optionally, identifying the one or more devices includes determining a set of device profiles based on the probes specified for the tier, parsing data from the responses to the targeted requests, and comparing the parsed data to identifying information in the device profiles, wherein the one or more devices are identified based on the comparison.

Optionally, determining the prioritized discovery plan is based on user input specifying a network ID, one or more protocols, one or more ports for each of the protocols, one or more probes, information related to the transmission settings, device recognition settings, or a network context.

Optionally, the prioritized discovery plan includes a first tier of broadcast requests for discovering active addresses on the network, and the processors are further operable when executing the instructions to: broadcast, in accordance with the prioritized discovery plan, requests to all candidate addresses on the network, and determine, based on one or more responses received from at least a subset of the addresses, the set of active addresses on the network.

In various embodiments, one or more computer-readable non-transitory storage media embody software for identifying devices on a network, the software including instructions operable when executed to determine, by a discovery application, a prioritized discovery plan including a plurality of tiers of requests, each of the tiers specifying one or more probes for targeting specific types of devices, wherein the prioritized discovery plan further includes transmission settings. For each of the tiers in the prioritized discovery plan, the instructions are further operable to cause, by the discovery application, one or more of the probes specified for the tier to transmit targeted requests to a set of active addresses on the network. Upon receiving responses from at least a subset of the one or more addresses, the instructions are further operable to identify, by the discovery application, one or more devices connected to the network based on the responses to the targeted requests. The instructions are further operable to remove, by the discovery application, addresses corresponding to the identified one or more devices from the set of active addresses on the network.

Optionally, identifying the one or more devices includes determining a set of device profiles based on the probes specified for the tier, parsing data from the responses to the targeted requests, and comparing the parsed data to identifying information in the device profiles, wherein the one or more devices are identified based on the comparison.

Optionally, determining the prioritized discovery plan is based on user input specifying a network ID, one or more protocols, one or more ports for each of the protocols, one or more probes, information related to the transmission settings, device recognition settings, or a network context.

Optionally, the prioritized discovery plan includes a first tier of broadcast requests for discovering active addresses on the network, and the instructions are further operable when executed to: broadcast, in accordance with the prioritized discovery plan, requests to all candidate addresses on the network, and determine, based on one or more responses received from at least a subset of the addresses, the set of active addresses on the network.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

The present disclosure introduces a discovery application aimed at identifying all discoverable devices connected to a network by using lightweight probes organized in a tiered structure. Specifically, the discovery application may cause various probes in different tiers to transmit requests in order to obtain information to identify the devices connected to the network. Probes in earlier tiers may transmit requests directed to more general objectives in order to survey the network and minimize the potential impact of the device identification process on the network, while probes in later tiers may have more targeted objectives in order to obtain sufficient information from the devices in order to identify them. To that end, probes may transmit requests for device information to various addresses on a network, where the requests may be received by the devices, if any, located at the addresses on the network. The devices located at the addresses may process the requests and generate corresponding responses with various device information that the discovery application may subsequently use to identify those devices. Additionally, a probe as referenced herein may be understood as a method of communicating with a specified network address using an application-layer protocol. Probes may also have additional variable attributes, such as credentials or the specific port numbers to transmit requests to, but may include any other attributes specific to a protocol or application. The addresses of a network may also be understood to include the range of discrete addresses that are available on the network, each of which may correspond to some device that is enabled to communicate through the network. The discovery application as described herein may also be applied in various different network environments.

Figure 1:
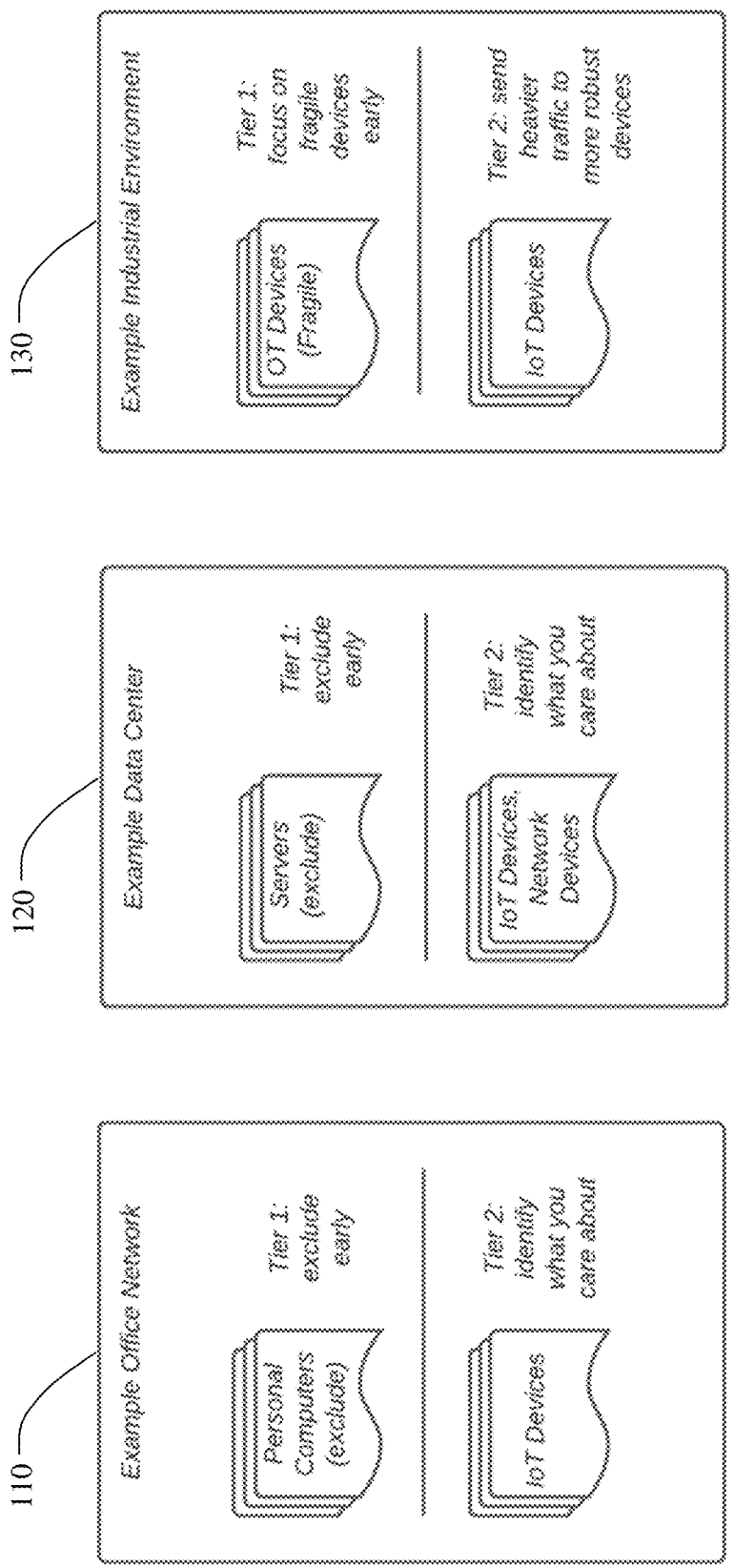
FIG. 1 illustrates brief schematics of different tiers of probes that may be executed when the discovery application is applied to different network environments.

FIG. 1 illustrates brief schematics of different tiers of probes that may be executed when the discovery application is applied to different network environments. For example, the discovery application may be applied to an office network environment 110, a data center environment 120, or an industrial network environment 130, although the discovery application may also be applied to many other network environments as well, such as a factory network environment, a hospital network environment, an airport network environment, and so on. When the discovery application is applied to an office network environment 110, the first tier of probes may be directed to identifying personal computers that may be connected to the network in order to exclude those personal computers early on. Personal computers may be excluded early on in the device identification process for any number of reasons, such as to preserve the user's privacy, and thus the first tier of probes may identify them in order to prevent subsequent probes in later tiers from transmitting additional requests to the personal computers in an attempt to identify them. Once the personal computers have been excluded, a second tier of probes may proceed to identify the various other Internet-of-Things (IoT) devices that may be connected to the office network. As referenced herein, an IoT device may be understood to be a device connected to a networked environment with the ability to transfer data over a network without requiring human-to-human or human-to-computer interaction.

In a data center environment 120, the first tier of probes may also be directed to identifying certain devices in order for those devices to be excluded from subsequent probes, but may be directed to identifying data center servers instead of personal computers. Similar to the personal computers, there may be various reasons for data center servers to be excluded early on, such as to prevent unintended disruptions to important operations being executed by those servers, and thus the first tier of probes may identify them in order to prevent subsequent probes in later tiers from transmitting additional requests to those servers. A second tier of probes may then identify other IoT and network devices that may be connected to the network.

In another similar example of an industrial network environment 130, the first tier of probes may be directed to identifying certain fragile Operational Technology (OT) devices that are connected to the network. For example, various OT devices configured to perform some task, such as monitoring, may be connected to the network in order to exchange limited amounts of information, but may not be equipped with the necessary processing ability to handle probe requests for identification data. In the case that the fragile OT devices do receive such requests that cause them to attempt to process the requests and generate corresponding responses, it may crash the fragile OT devices. Thus, the first tier of probes may identify such fragile OT devices in order to exclude them from subsequent probes and prevent the fragile OT devices from potentially crashing. A second tier of probes may then transmit requests with heavier network traffic to the other IoT devices connected to the network which may be more robust and equipped with the necessary processing capability to handle the probe requests.

Although FIG. 1 only shows two tiers of probes being executed when the discovery application is applied to various network environments, the discovery application may also execute more than two tiers of probes. To that end, FIGS. 2A-2G illustrate a more detailed example of the device identification process that various embodiments of the discovery application may perform in identifying devices on a network, such as an office network 110.

Figure 2A:
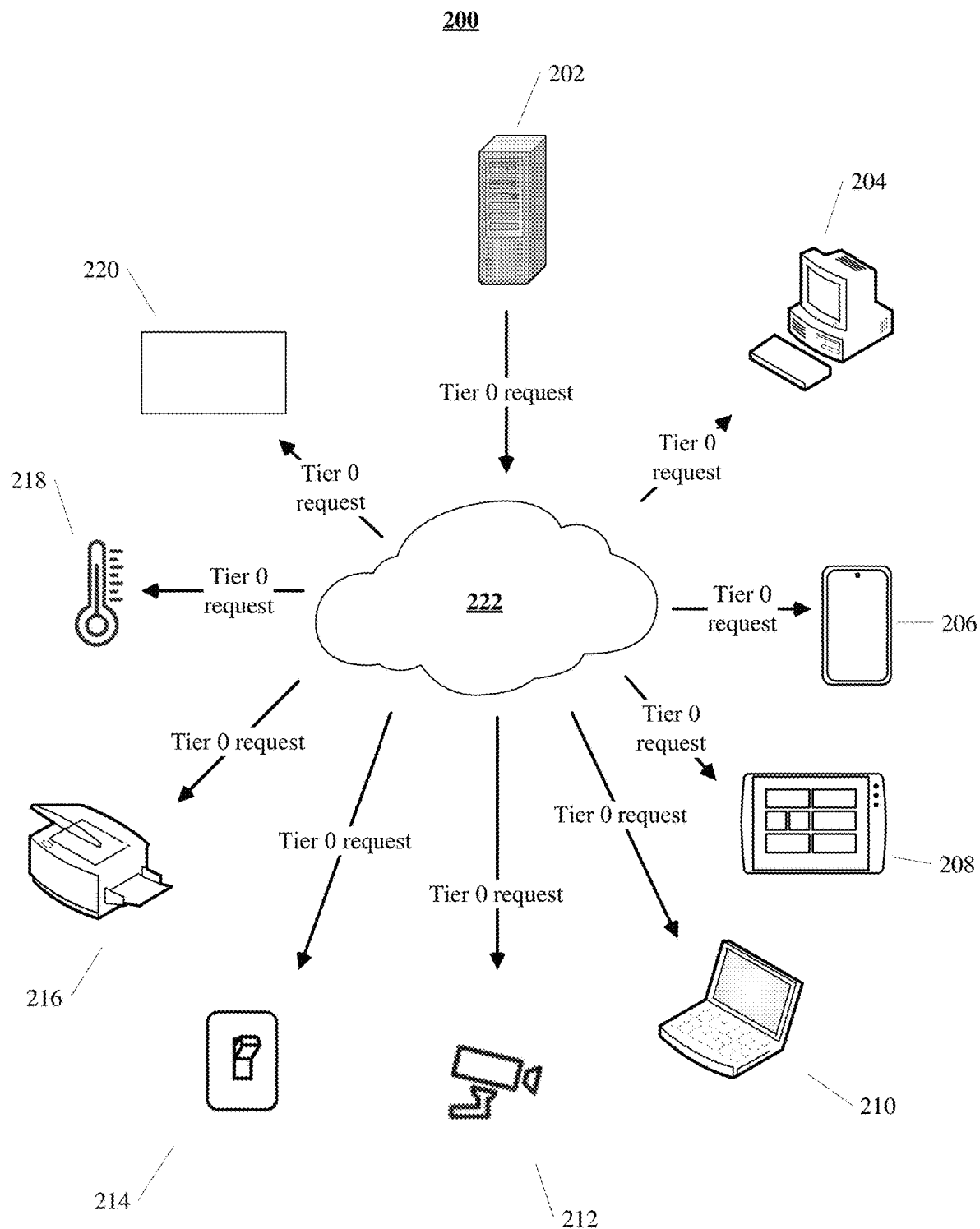
FIG. 2A illustrates a schematic when an exemplary discovery application causes a first tier of probes to transmit requests to addresses on a network.

FIG. 2A illustrates a schematic 200 when an exemplary discovery application causes a first tier of probes to transmit requests to addresses on a network 222, such as an office network. The discovery application may execute on a server 202 that is connected to the network. Although a server may be illustrated, it may be understood that the discovery application may also be executed on a device, such as a separate mobile device carried into a wireless network environment or plugged into a hard-wired network, or a plug-in or software service, such as software executing on a computer already connected to a hard-wired network environment in which the device identification operation is to be performed. The network 222 may also include various Internet-of-Things (IoT) devices. For example, there may be various electronic devices connected to the network, such as a desktop computer 204, a mobile device 206, a tablet 208, and a laptop 110. Additionally, the network 222 may include other devices such as a security camera 212, a light switch 214, a printer 216, and a thermostat 218. All of these various IoT devices may be located at a specific address on the network 222 and may be configured to exchange data with other devices over the network 222. There may also be any number of addresses 220 where there is no device located at those addresses. Such addresses may also be referred to herein as empty addresses.

When the discovery application is executed on the server 202, the discovery application may first proceed with executing a first tier of probes that transmits requests to all addresses on the network 222, which may essentially mean the first tier of probes broadcasts requests to all the addresses on the network. The first tier of probes may broadcast the requests through the network 222 to all addresses on the network, which may include the addresses with devices 204-218 as well as the empty addresses 220 with no device, in order for the discovery application to determine which addresses on the network have devices located at them and are thus active addresses. However, it may be noted that for active addresses identified may not include any address for which there is a device connected to the network and is configured to respond to requests transmitted to that address, but the device is turned off, and therefore unresponsive. The requests broadcasted by the first tier of probes may also be referred to as tier 0 requests in order to differentiate them from the requests that subsequent tiers of probes may transmit. In various embodiments, the tier 0 requests may be Internet Control Message Protocol (ICMP) echo requests to ping any potential devices located at an address on the network 222, although various other types of requests may also be appropriate.

Figure 2B:
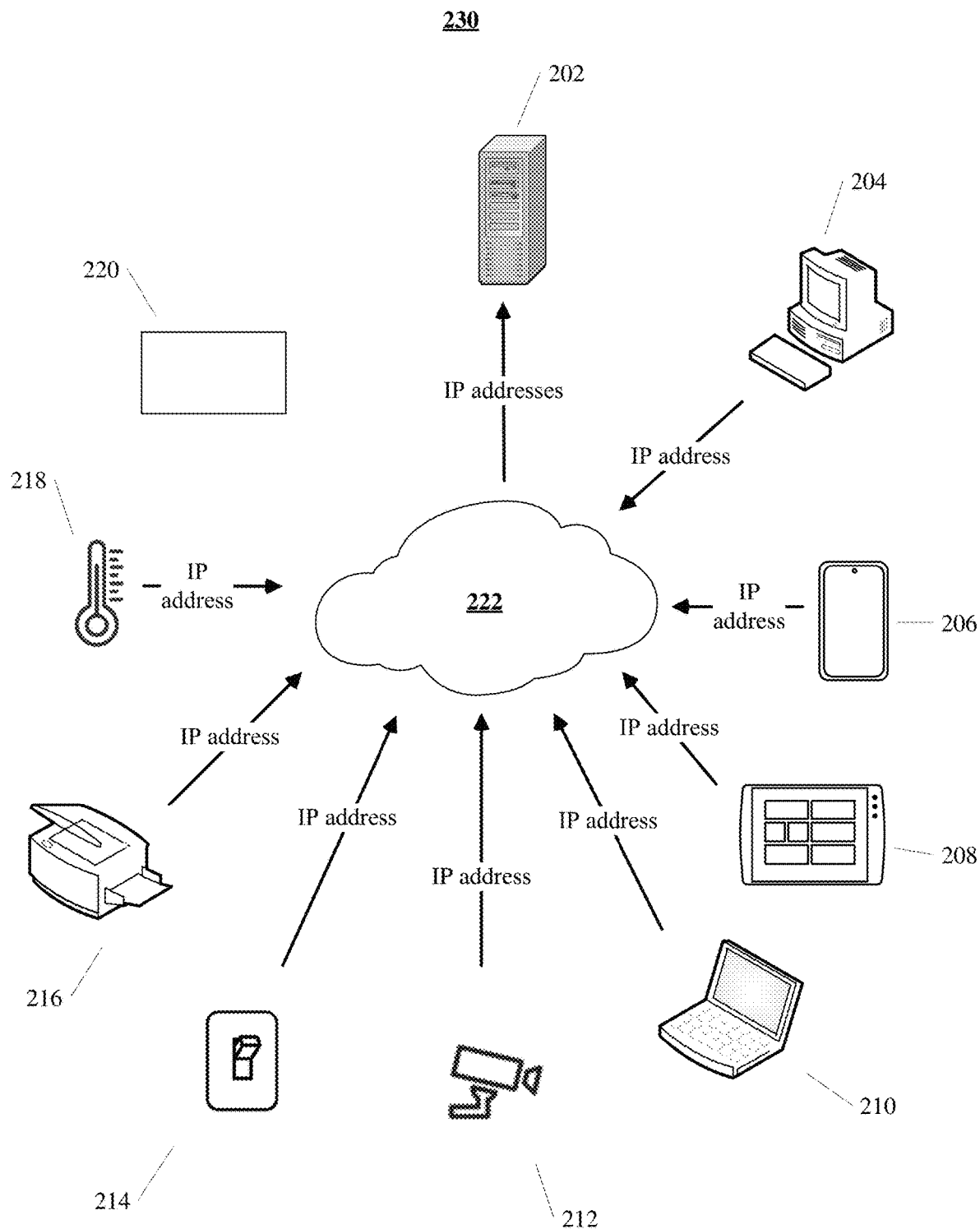
FIG. 2B illustrates a schematic where the devices located at various addresses on the network respond to the requests transmitted by the first tier of probes.

FIG. 2B illustrates a schematic 230 where the devices located at various addresses on the network 222 respond to the requests transmitted by the first tier of probes. After the devices 204-218 receive the tier 0 requests, which as mentioned above may be ICMP echo requests, the devices may process the tier 0 requests to generate a corresponding response, which in the case of ICMP echo requests may simply include responding with the same payload received in the initial ICMP request. In various other embodiments and as illustrated in the figure, the devices' responses to the tier 0 requests may be the Internet Protocol (IP) addresses that the devices are located at, where each of the devices 204-218 may generate a response that includes the IP address they are located at. The responses may then be transmitted through the network 222 back to the discovery application executing on the server 202. In this way, the discovery application may obtain a list of all the active addresses on the network, or all the addresses with a device located at them. Relatedly, it may also be noted that no response may be generated and transmitted from the empty address 220 as there may not be any device to process the tier 0 request and generate a corresponding response. Since the discovery application may not receive a response from the empty address 220, the discovery application may conclude that there is no device to identify at that address and thus may be ignored by subsequent tiers of probes. In this way, the tier 0 requests broadcasted by the first tier of probes may enable the discovery application to determine which subset of addresses on a network have a corresponding device and thus which addresses to focus on, as well as which addresses subsequent tiers of probes should stop transmitting additional requests to. As a result, this may minimize the potential impact to the network 222 by reducing unnecessary network traffic that may result from continuously transmitting requests to addresses that have no device to be identified.

Figure 2C:
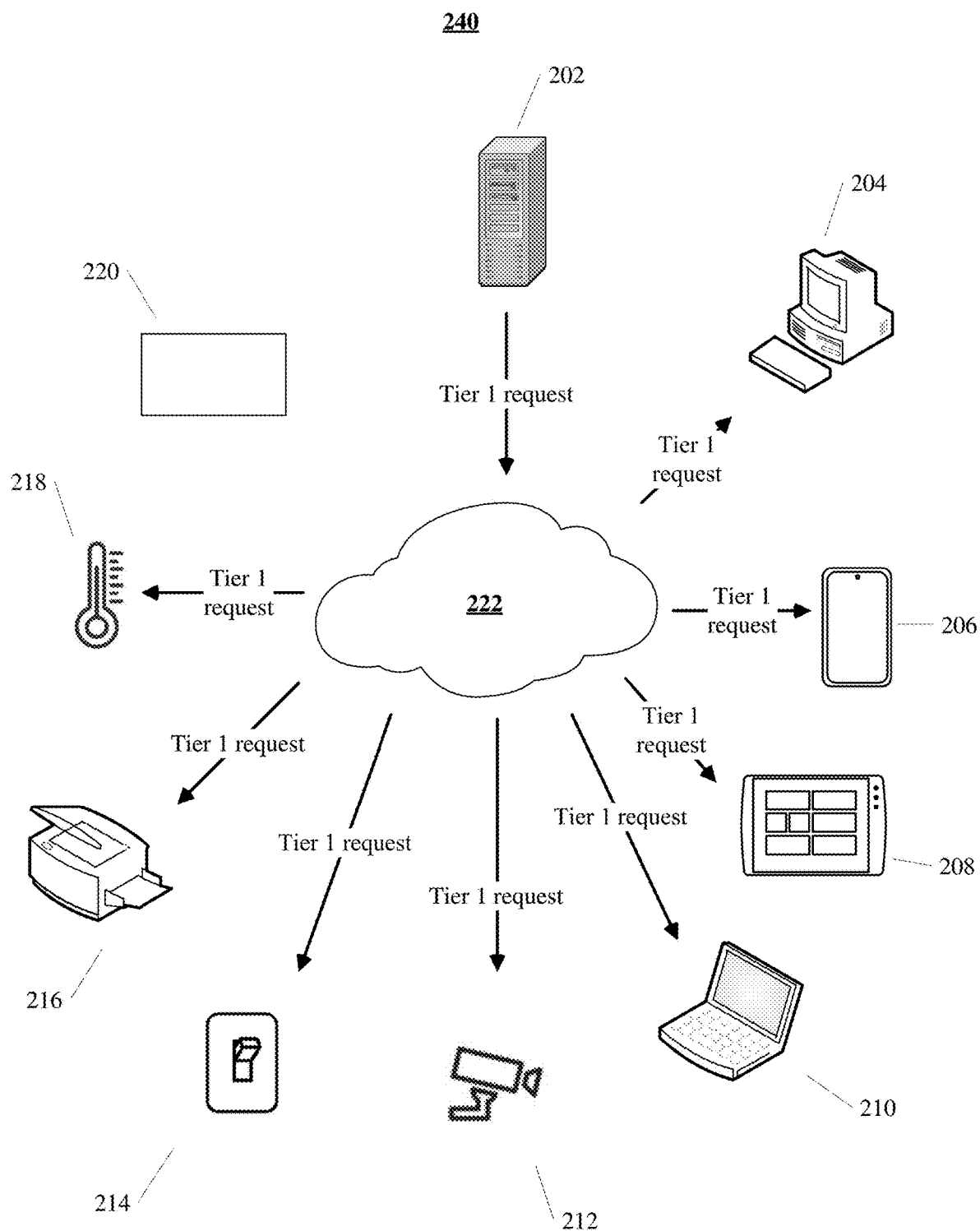
FIG. 2C illustrates a schematic when the discovery application causes a second tier of probes to transmit requests to addresses on the network.

FIG. 2C illustrates a schematic 240 when the discovery application causes a second tier of probes to transmit requests to addresses on the network 222. After the discovery application executing on the server 202 receives the responses to the tier 0 requests and determines the active addresses on the network that have a device located at them, the discovery application may proceed with executing a second tier of probes to begin identifying the devices on the network. As such, the discovery application may cause the second tier of probes to transmit tier 1 requests to the addresses that the devices 204-218 are located at. It may be noted that the requests transmitted by the second tier of probes may be referred to as tier 1 requests to differentiate them from the tier 0 requests that may have been transmitted by the first tier of probes. Further, since the discovery application may be aware of the empty address 220 as a result of the responses to the tier 0 requests that were previously received as shown in FIG. 2B, the discovery application may cause the second tier of probes to not transmit a tier 1 request to that empty address. Additionally, because the tier 1 requests may not be transmitted to all of the addresses on the network, the discovery application may cause the second tier of probes to transmit the tier 1 requests as multicast instead of broadcast. Further, while the objective of the tier 0 requests may have been to determine the active addresses on the network, the objective of the tier 1 requests may be to determine whether any of the devices 204-218 on the network are part of an excluded category of devices that subsequent probes should not transmit additional requests to. In various network environments, the particular category or categories of devices to be excluded may be based on various considerations. As mentioned above with respect to FIG. 1, there may be fragile devices connected to the network that are not equipped to handle the processing required to respond to later tiers of requests that are transmitted by the discovery application. In this case, the second tier of probes may include various different probes for transmitting requests to identify these fragile devices, such as a Transmission Control Protocol (TCP) probe to transmit a synchronize (SYN) packet to specific open TCP ports or a custom probe for the particular device. Alternatively, it may be the case that attempting to identify some devices may result in interruptions to certain operations. But regardless of the exact considerations that results in one or more categories of devices to be excluded, it may be sufficient in various situations to just determine that the device is in the excluded category without fulling identifying the exact device, and thus the tier 1 requests may accordingly be directed to that objective.

Figure 2D:
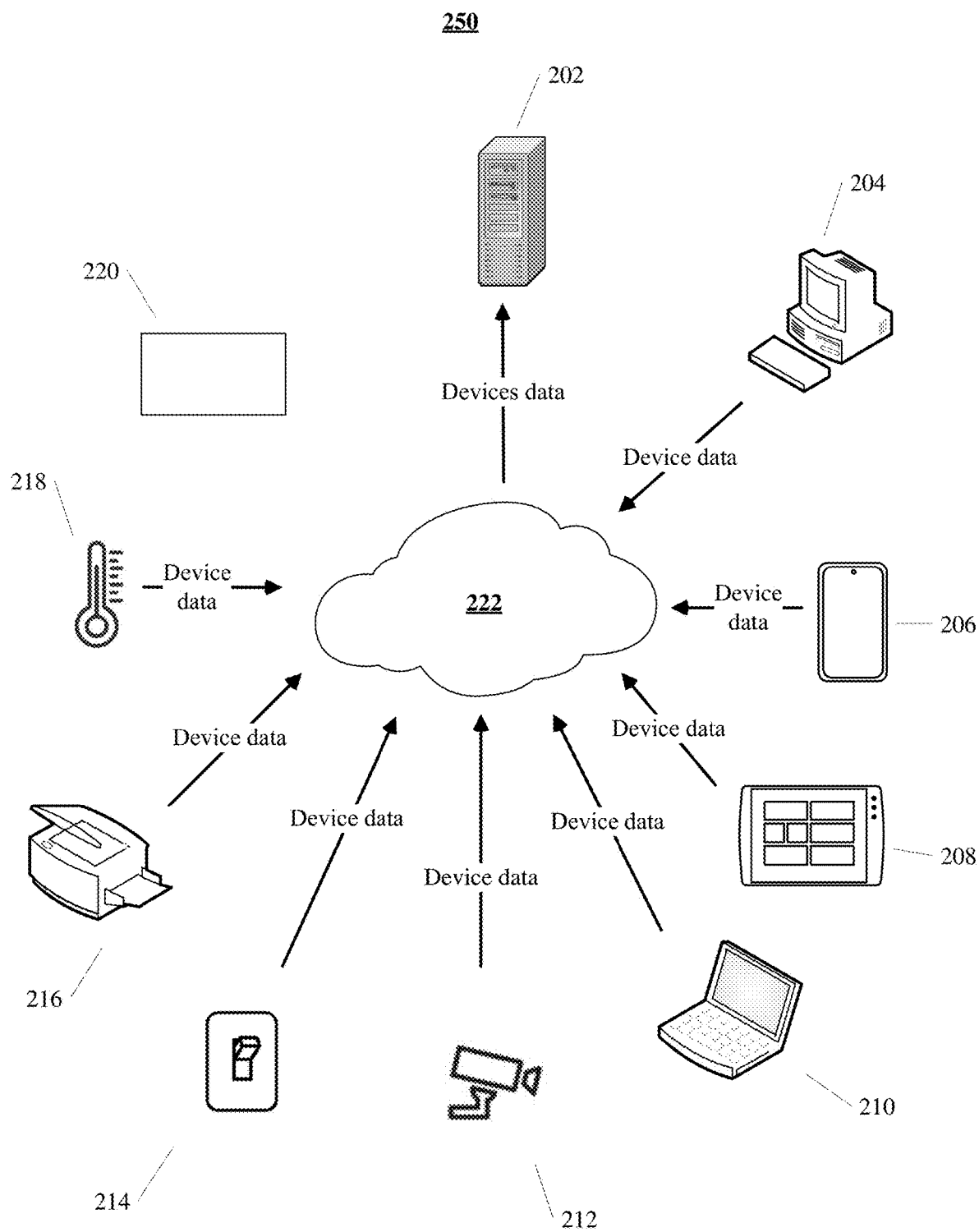
FIG. 2D illustrates a schematic where the devices located at various addresses on the network respond to the requests transmitted by the second tier of probes.

FIG. 2D illustrates a schematic 250 where the devices located at various addresses on the network 222 respond to the requests transmitted by the second tier of probes. After receiving the tier 1 requests, the devices 204-218 may process the requests and generate a corresponding response. Since the objective of the tier 1 requests may be to determine whether any devices are part of an excluded category of devices, the tier 1 requests may accordingly request the devices respond with specific data that may allow the discovery application executing on the server 202 to make that determination. As such, each of the devices 204-212 may generate a response with the requested device data and transmit the response through the network 222 to the discovery application on server 202. After receiving the responses, the discovery application may analyze the device data for the various devices to determine which, if any, devices are part of an excluded category of devices. In this network, it may be that the desktop computer 204 may be a fragile device that should be excluded as it is executing some operation that may be interrupted if it receives more complex requests transmitted by subsequent tiers of probes. The printer 216 may also be a fragile device that should be excluded as requests from subsequent tiers of probes may cause the printer 216 to malfunction as it may not be equipped with the necessary processing ability to handle the more complex requests that subsequent tiers of probes may transmit. The mobile device 206, tablet 208, and laptop 210 may also be part of an excluded category of devices as they may be personal electronic items which should not be identified to preserve individual users' privacy. Although some of the devices 204-218 may be excluded for various reasons, it may be noted that the characterization made herein is arbitrary and various other devices may also be excluded for various other reasons.

Figure 2E:
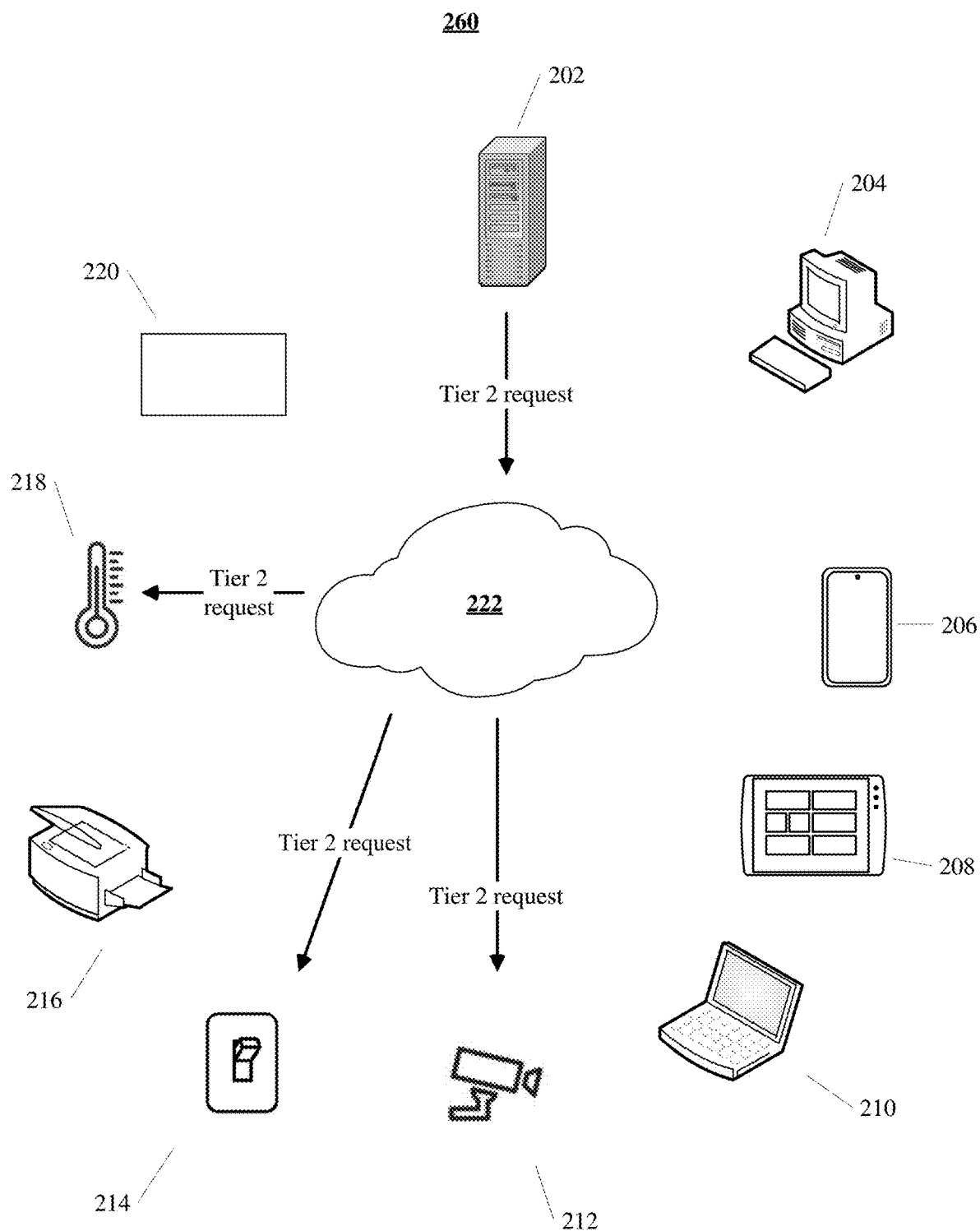
FIG. 2E illustrates a schematic when the discovery application causes a third tier of probes to transmit requests to addresses on the network.

FIG. 2E illustrates a schematic 260 when the discovery application causes a third tier of probes to transmit requests to addresses on the network 222. After the discovery application executing on the server 202 receives the device data as part of the responses to the tier 1 requests and determines that some devices are part of one or more excluded categories of devices, the discovery application may proceed with executing a third tier of probes to fully identify the remaining non-excluded devices on the network. Since the excluded devices should no longer receive additional requests, the discovery application may remove the addresses corresponding to those devices from the list of active addresses such that the remaining active addresses only include the non-excluded devices to be identified. As such, the discovery application may cause the third tier of probes to transmit tier 2 requests to the remaining active addresses that do not have an excluded device located at them. Specifically, the discovery application may cause the third tier of probes to transmit the tier 2 requests to the addresses that the security camera 212, light switch 214, and thermostat 218 is located at. Additionally, the tier 2 requests may also be transmitted as unicast requests, as compared to the tier 1 multicast requests and the tier 0 broadcast requests. Although the schematic 260 is illustrated with the tier 2 requests being transmitted to a smaller subset of the addresses on the network 222, in various embodiments, the tier 2 requests may instead be transmitted to a much larger range of addresses than the tier 0 or tier 1 requests, such as to identify the remaining devices once any fragile or excluded devices have been identified. In such cases, multicast requests may not be able to be successfully transmitted to all the addresses on the network since multicast requests may not travel across the various routers for the larger range of addresses on the network, so the tier 2 requests may be transmitted as unicast requests to reduce the possibility that addresses are missed due to failed transmissions. Further, the objective of the tier 2 requests may be to fully identify the devices located at the remaining active addresses. As such, the tier 2 requests may either request the devices located at the remaining active addresses to respond with any identification data the devices may have or respond with specific information (such as the device's make, model, part number, etc.) that may allow the discovery application to identify the device.

Figure 2F:
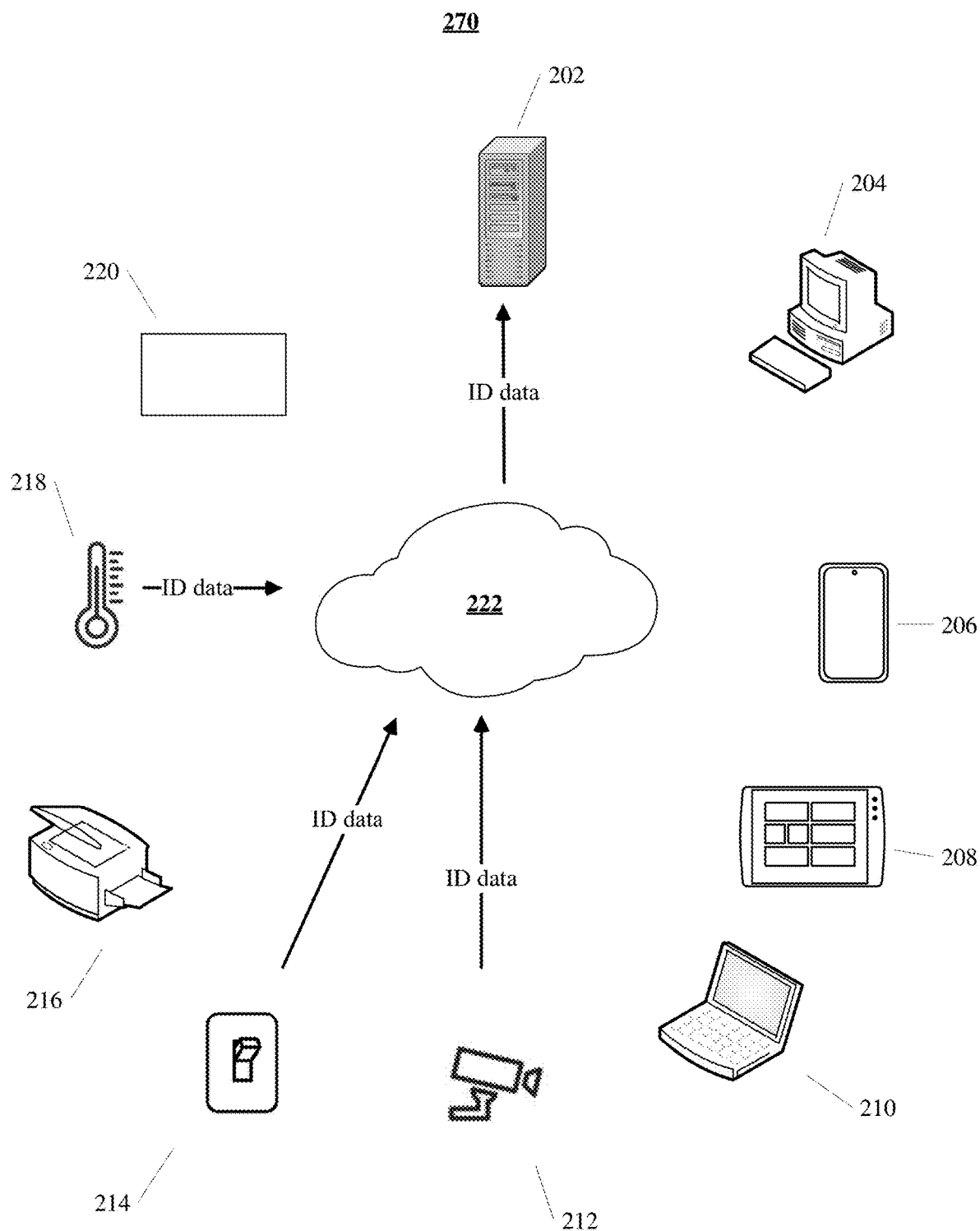
FIG. 2F illustrates a schematic where the devices located at the remaining active addresses on the network respond to the requests transmitted by the third tier of probes.

FIG. 2F illustrates a schematic 270 where the devices located at the remaining active addresses on the network 222 respond to the requests transmitted by the third tier of probes. Since the tier 2 requests may request the devices 212, 214 and 218 to provide various identification data, the devices may respond accordingly with various identification data. The identification data from each of the devices located at the remaining active addresses may then be transmitted back to the discovery application executing on the server 202 through the network 222. After receiving the responses, the discovery application may analyze the devices' identification data to identify device 212 as a security camera, device 214 as a light switch, and device 218 as a thermostat. Various approaches may be taken as part of this identification process, such as comparing the identification data received from the devices to device profiles with information known to be associated with certain devices, as described further herein. Additionally, although only the third tier of probes may have transmitted requests to devices for identification data in the example described thus far, various embodiments may include more than one tier of probes for transmitting such requests in order to spread out the network traffic resulting from all the requests and thus minimize the impact to the network 222.

Figure 2G:
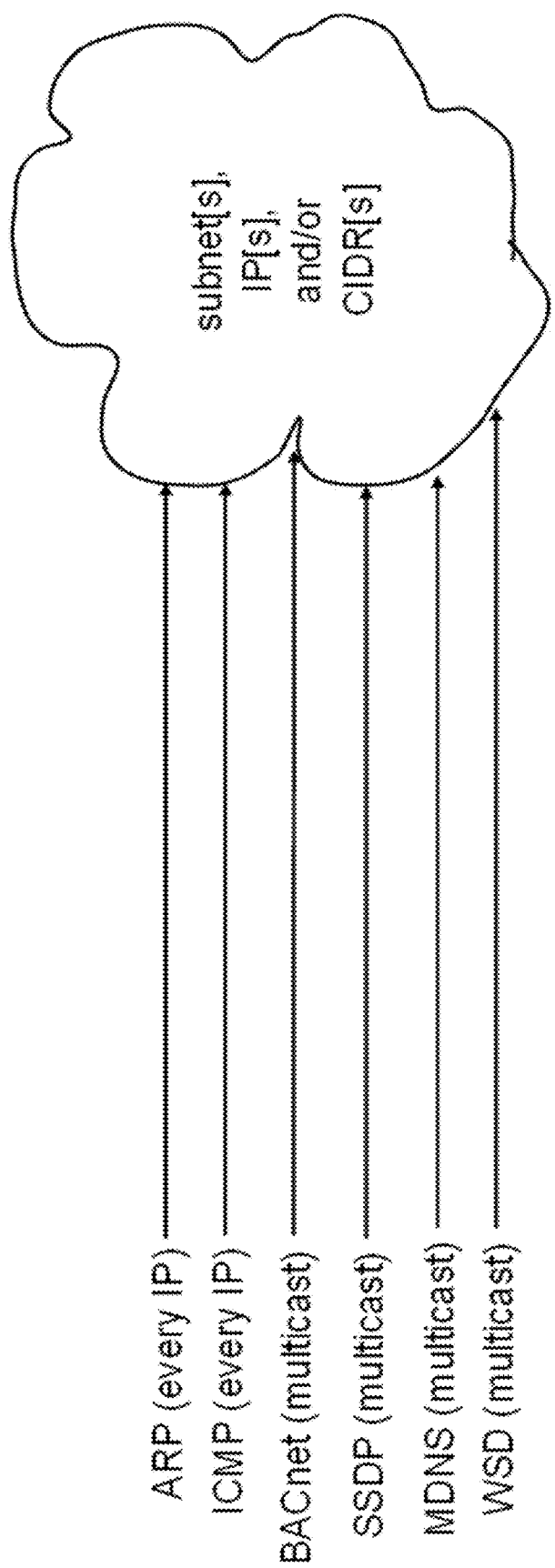
FIG. 2G illustrates a schematic of the overall device identification process performed by the discovery application.

FIG. 2G illustrates a schematic 280 of the overall device identification process performed by the discovery application as described in FIGS. 2A-2F. Across the entire identification process, the discovery application may have executed probes for each of Address Resolution Protocol (ARP), Internet Control Message Protocol (ICMP), Building Automation and Control network (BACnet), Simple Service Discovery Protocol (SSDP), multicast DNS (MDNS), and Web Services for Devices (WSD), but the probes may have been executed separately in multiple different tiers as opposed to all at once in a single tier. Each of the probes may have transmitted requests to a network, which may have been a subnet, a set of IPs, or a Classless Inter-Domain Routing (CIDR). For example, the ARP and ICMP probes may have been a first tier of probes that the discovery application may have caused to broadcast requests to all the IP addresses on the network, which may be analogous to the first tier of probes and tier 0 broadcast requests as described with respect to FIG. 2A. On the other hand, the BACnet, SSDP, MDNS, and WSD probes may have been a second and third tier of probes that the discovery application caused to transmit various requests as multicast, which may be analogous to the second tier of probes and tier 1 multicast requests as described with respect to FIG. 2C, or even the third tier of probes and tier 2 requests as described with respect to FIG. 2E. Overall, the end result may be that a discovery application executed various probes to identify devices on a network, but that process may have involved splitting the probes into various tiers and executing them at least somewhat separately in order to minimize the impact that the device identification process may have on a network. The discovery application may thus be generalized by building on the example discovery application described thus far.

Figure 3:
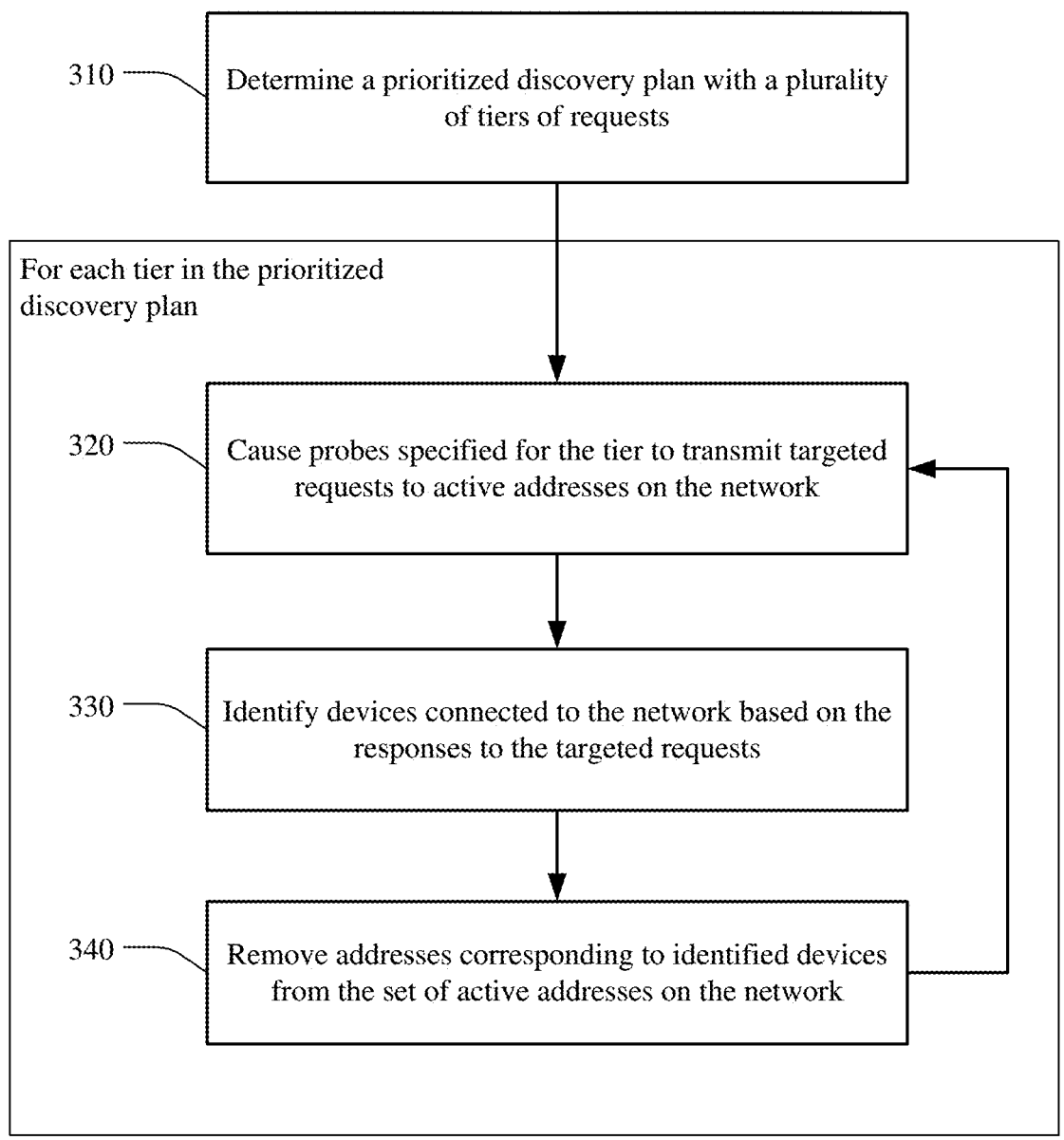
FIG. 3 illustrates steps in an example method for identifying devices on a network.

FIG. 3 illustrates steps in an example method 300 for identifying devices on a network. Various embodiments of a discovery application may execute the method 300, which may begin at step 310 to determine a prioritized discovery plan with a plurality of tiers of requests. Specifically, the prioritized discovery plan may specify which probes to execute in which tiers and what requests each of the probes may transmit in order to inform the discovery application on how to execute the various probes to identify the devices on a network. For example, and using the example of FIGS. 2A-2F, the prioritized discovery plan may include three tiers of probes. The first tier of probes may include ICMP probes for transmitting echo requests to addresses on the network, while a second tier of probes may transmit requests to identify fragile and excluded devices, and a final third tier for identifying the remaining devices on the network.

More generally, the prioritized discovery plan may include various tiers of probes that transmit requests to addresses on a network in accordance with the tier they are in, which may mean that probes in earlier tiers may transmit requests before the probes in later tiers. The discovery application may then execute the probes according to the prioritized discovery plan such that different probes are executed at different times instead of concurrently all at the same time. As described above with respect to FIGS. 2A-2F, various embodiments of the prioritized discovery plan may include a first tier of probes to broadcast requests to all the addresses on the network in order to discover the active addresses on the network that have a device located at those addresses. Although various embodiments of the prioritized discovery plan may include a first tier of probes to broadcast requests, various other embodiments may not include probes that broadcast requests as the active addresses may have already been determined before the method 300 was executed or reducing the addresses on the network to a smaller subset of active addresses may not result in sufficient benefits to offset the additional cost of a broadcast tier, among many other potential reasons. Instead of a first tier of probes to broadcast requests, the prioritized discovery plan may just start with a first tier of probes that transmits requests as multicast to various addresses on the network. The plan may then include any number of additional tiers of probes as necessary to identify the devices on a network.

The prioritized discovery plan may also organize probes into various tiers by prioritizing the probes based on various characteristics. For example, the prioritized discovery plan may specify that probes in later tiers are those which transmit requests using less common communication protocols compared to the probes in earlier tiers. Alternatively, the prioritized discovery plan may specify that probes in later tiers are those which transmit requests to less common port numbers for various addresses on the network compared to the probes in earlier tiers. The prioritized discovery plan may also defer execution of probes that are more resource-intensive to later tiers. For example, probes which may transmit requests as unicast may require more network bandwidth than probes that transmit requests as multicast, and thus the former probes may be executed in later tiers. As another example, various embodiments of the prioritized discovery plan may specify a threshold number of packets that may be used when transmitting requests in a given tier. The prioritized discovery plan may then specify that probes which may exceed the threshold for earlier tiers when they transmit requests are to be executed in later tiers. Additionally, the prioritized discovery plan may specify certain probes which transmit requests with short timeout thresholds (e.g., 1 second) to earlier tiers, while other probes which transmit requests with longer timeout thresholds may be specified to later tiers. In other words, probes which transmit requests that generate corresponding responses in shorter timeframes may be specified to earlier tiers while probes which transmit requests that generate corresponding responses in longer timeframes may be specified to later tiers. While some prioritization characteristics are described herein, various embodiments of the prioritized discovery plan may also utilize many other prioritization methods to organize probes into various tiers.

Additionally, each of the tiers may specify one or more probes for targeting specific types of devices. For example, a first tier may specify probes that target the fragile and excluded devices on a network. In various embodiments, this may be to identify devices such as printers and personal electronic devices such as those described with respect to FIGS. 2A-2F. Another tier may specify probes that are targeted at devices performing particular tasks. A third tier may then specify probes that are targeted at devices that generate comparably more traffic for the network than the other devices on the network. However, the tiers in various probes may also target other types of devices as appropriate in various embodiments.

| Example prioritized discovery plan |
|---|
| {<br>  "description": "Tier 0: IP addresses"<br>  "probes": [<br>    { "name": "icmp" }<br>  ]<br>},<br>{<br>  "description": "Tier 1: Port probes to pare down candidate hosts",<br>  "probes": [<br>    {<br>      "name": "udp",<br>      "udp_ports": [161, 1900, 3702, 5353]<br>    }, |

| Example prioritized discovery plan |
|---|
| -continued |
|     {<br>      "name": "tcp",<br>      "tcp_ports": [80, 8000, 8080],<br>      "tls_ports": [443, 8443]<br>    }<br>  ]<br>},<br>{<br>  "description": "Tier 2: Identify devices",<br>  "config": [<br>    {"field": "mdns_do_broadcast", "value": "false"},<br>    {"field": "mdns_do_unicast", "value": "true"},<br>    {"field": "mdns_service_types", "value": "_http._tcp, _https._tcp, _rtsp._tcp, _ipp._tcp, _ipps._tcp, _workstation._tcp, _smb._tcp, _ftp._tcp, _afpovertcp._tcp, _daap._tcp, _qdiscover._tcp, _device-info._tcp, _printer._tcp, _pdl-datastream._tcp, _telnet._tcp, _tftp._udp, _adisk._tcp, _dns-sd._udp"},<br>    {"field": "upnp_do_broadcast", "value": "false"},<br>    {"field": "upnp_do_unicast", "value": "true"},<br>    {"field": "wsd_do_broadcast", "value": "false"},<br>    {"field": "wsd_do_unicast", "value": "true"}<br>  ],<br>  "probes": [<br>    { "name": "mdns" },<br>    { "name": "upnp" },<br>    { "name": "wsd" },<br>    { "name": "snmp" },<br>    { "name": "http" ,<br>    "tcp_ports": [80, 8000, 8080],<br>    "tls_ports": [443, 8443]<br>} |

An example prioritized discovery plan is also included. The first tier of the plan may be directed to determining the active addresses on a network and may include an ICMP probe. As mentioned above, the ICMP probe may broadcast requests to all the addresses on a network where the responses to those requests may then be used to determine which addresses have devices located at them and are thus active addresses. The second tier of the prioritized discovery plan may be directed to determining which port numbers the devices at various addresses are communicating through, and may include a User Datagram Protocol (UDP) probe that may transmit requests to certain port numbers, as well as a Transmission Control Protocol (TCP) probe that may transmit requests to certain TCP ports and Transport Layer Security (TLS) ports. In additional to identifying which port numbers various devices may be communicating through, the requests transmitted by the TCP probe may also cause some devices to generate responses with enough data to identify them.

The third tier of the example prioritized discovery plan may then be directed to identifying the remaining devices on the network. Since this third tier may include a variety of probes, the tier may also include a set of configuration settings directed to various aspects of the probes. Specifically, an mdns_do_broadcast field may correspond to whether the MDNS probe will broadcast requests, where the false value may indicate that the MDNS probe will not broadcast requests. Similarly, an mdns_do_unicast field may correspond to whether the MDNS probe will transmit requests as unicast, and the true value may indicate that the MDNS probe will transmit requests as unicast. The mdns_service_types field may correspond to requests directed to different service types. For example, a value of "_http._tcp" may be requests from a TCP probe searching for any device communicating via Hypertext Transfer Protocol (HTTP), and a value of "_ftp._tcp" may be requests from a TCP probe searching for any device communicating via File Transfer Protocol (FTP), while "_ssh._tcp" may be requests from a TCP probe searching for any device associated with a running Secure Shell (SSH) server. Similar to the MDNS probe settings, the upnp_do_broadcast may indicate whether the Universal Plug and Play (UPnP) probe will broadcast requests, upnp_do_unicast may indicate whether the UPnP probe will transmit requests as unicast, and similarly for the remaining two configuration settings for the WSD probe. The third tier of the example prioritized discovery plan may also specify that the MDNS, UPnP, WSD, Simple Network Management Protocol (SNMP), and HTTP probes are in the tier, where one or more of the probes may transmit requests to certain TCP and TLS ports.

In various embodiments, the prioritized discovery plan may also include a set of transmission settings for controlling various aspects of the device identification process. The transmission settings may be configured to help the device identification process minimize the impact to the network while also efficiently identifying all of the devices on the network. Specifically, the transmission settings may be configured help keep the probes lightweight to minimize the impact on the network. At the same time, the transmission settings may also help maximize the speed at which the devices may be identified while still avoiding any security alerts that may be triggered as a result of increasing the speed too much, such as Distributed Denial of Service (DDoS) alerts, or any device faults that may result from increasing the speed too much, such as fragile devices crashing. In various embodiments, the transmission settings may include a maximum number of concurrent hosts that probes may transmit requests to, a maximum number of multicast requests that may be transmitted per second, a maximum packet rate when transmitting requests, a maximum packet rate for different addresses, a timeout threshold before failed requests are re-transmitted, among many potential others. The transmission settings may also be applied at various granularity levels. Specifically, some settings may be applied globally to all requests transmitted by every tier of probes, others settings may be applied only to the requests transmitted by a specific tier of probes, while others may only be applied to the requests transmitted by a specific probe.

The prioritized discovery plan may also be determined in various different ways. For example, a complete or mostly complete plan may be provided directly by a user, where that user provided plan may then only need to be converted into an executable format in step 310 of method 300. For example, the user provided plan may include which probes to execute, which tier to execute each probe, which addresses on a network to identify devices for, and any other necessary configuration settings as appropriate in various embodiments. The user provided plan may be provided in various human readable formats, such as a set of configuration settings, which may then only need to be converted into a series of machine-executable steps. The user provided plan may also be provided as a custom data structure with configuration data which may then be passed to the discovery application. The user provided plan may also be provided as a series of command-line arguments in various embodiments. Alternatively, instead of a complete or mostly complete plan, a general outline of a desired prioritized discovery plan may be provided by a user, where the discovery application may generate an appropriate plan based on the outline. For example, the outline may include an identifier for a network in which devices are to be identified. The discovery application may then identify and retrieve a pre-existing prioritized discovery plan based on the network identifier and make any modifications as appropriate to apply the plan to the network indicated by the network identifier, or identify and retrieve a prioritized discovery plan template and update the template based on various information about the network indicated by the network identifier. Similarly, the outline may include a context for the network in which devices are to be identified, and an appropriate prioritized discovery plan may be determined based on that network context. For example, the network context may indicate that the network is a hospital network, so the prioritized discovery plan to use may be one particularly designed for hospital networks, with pre-selected probes in various pre-selected tiers.

Alternatively, the outline provided by a user may include a number of communication protocols that devices on a network may use to communicate on the network. Determining the prioritized discovery plan may then include generating probes corresponding to the communication protocols, and then assigning the probes to different tiers based on some pre-existing guideline, such as probes corresponding to more commonly used communication protocols being assigned to earlier tiers while probes corresponding to less commonly used communication protocols being assigned to later tiers. The outline may also instead include a number of ports associated with various communication protocols that devices on a network may use to communicate on the network. The prioritized discovery plan may then be determined by again generating probes corresponding to the communication protocols, but the probes may be assigned to different tiers such that the probes corresponding to the more commonly used port numbers are in earlier tiers while the probes corresponding to the less commonly used port numbers are in later tiers. The outline may also include various probes to execute, and determining the prioritized discovery plan may include organizing the probes into tiers based on some guideline, such as those discussed above. In cases where the outline provided by a user includes communication protocols, port numbers, or probes, the prioritized discovery plan may also be determined by retrieving a pre-existing plan and modifying as appropriate based on the contents of the outline provided. The user input may also include any combination of the items discussed, and determining the prioritized discovery plan in such cases may be based on the multiple different items that are provided, such as a network identifier as well as the executable probes. In various embodiments, user input may also include various transmission settings (such as maximum packet rate) or device recognition settings (such as a certainty threshold when classifying devices), which may also be used to determine the prioritized discovery plan. For example, user input that provides different transmission settings may result in different probes being in different tiers or even result in a different number of tiers overall.

After the prioritized discovery plan has been determined, a discovery application may then execute each of the remaining steps in method 300 for each tier that is specified in the prioritized discovery plan. At step 320 of method 300, the discovery application may cause the probes specified for a given tier to transmit requests to the active addresses on the network. These requests that are transmitted to the active addresses may also be referred to as targeted requests as the requests may be targeted at the devices located at the addresses on the network in order to obtain information that can subsequently be used to identify them. In cases where the prioritized discovery plan includes a first tier of probes that broadcasts requests to all the addresses on the network, the first iteration of step 320 may include probes transmitting targeted requests to the active addresses on the network where a device may be located at those addresses, as well as any empty addresses with no device located at them. However, step 320 in most cases may include the discovery application causing the probes in a given tier to transmit targeted requests to at least some of the active addresses on the network. Because the prioritized discovery plan may specify that some probes transmit requests as multicast and other probes transmit requests as unicast, different iterations of step 320 may include probes transmitting the targeted requests as either multicast or unicast. It may also be noted that because step 320 may be executed multiple times in any particular execution of the method 300 if the prioritized discovery plan includes more than one tier, subsequent iterations of step 320 may include probes transmitting requests to fewer and fewer active addresses. This may be the case because by the time step 320 is executed for the later and later tiers in the prioritized discovery plan, more and more devices may have already been identified from the requests in earlier tiers, and thus additional requests from later probes do no need to be transmitted to those addresses corresponding to the identified devices.

As mentioned above, the prioritized discovery plan may include transmission settings to control various aspects of the device identification process, and because the probes may transmit requests in accordance with those transmission settings, step 320 may include monitoring the transmission process to ensure compliance with the transmission settings. For example, if the transmission settings are configured such that there is a maximum packet rate limit for the present tier, the discovery application may monitor the probes as they transmit the requests to ensure the packet rate is not exceeded. If the packet rate limit may be exceeded, the discovery application may need to interrupt the process in some way to maintain the limit, such as delaying some probes from transmitting requests to bring down the packet rate.

Example Probe Configuration Settings
{
"name": "BACnet",
"type": "struct",
"struct": [
{
"name": "Port",
"type": "uint",
"desc": "BACnet Port to probe. Optional",
"default": "47808"
},
{
"name": "MaxMsgPerS",
"type": "uint",
"desc": "BACnet max requests per second. Optional",
"default": "0"
},
{
"name": "TimeoutMs",
"type": "uint",
"desc": "Time to wait in milliseconds for BACnet replies",
"default": "defaultTimeoutMs"
}

In various embodiments, the probes in each tier may also include their own configuration settings, as shown in the example probe configuration settings which may be for a BACnet probe. The probe configuration settings may all be optional and may only be applied in various situations, such as if the transmission settings of the prioritized discovery plan are not to be applied to the specific probe or if a user specifically indicates that a probe is to execute using different settings. The example configuration settings may include a default port, which in the example may be set to port 47808, that the BACnet probe may transmit requests to. The example configuration settings may also include a maximum for the number of requests which the BACnet probe may transmit per second. Additionally, the configuration settings may include a specific timeout threshold in milliseconds for the amount of time to wait for replies before deciding that all responses from any active addresses have been received, as described further herein. In various embodiments, the timeout threshold may also refer to the amount of time to wait for replies before deciding that the request failed to be delivered and that another request should be transmitted, as also described further herein.

Some of the probes which transmit the requests may also be constructed by a third-party separate from the party associated with the discovery application. This may be the case if a third-party was interested in identifying devices on a network that may be communicating through a particular proprietary protocol. In such cases, a probe may be constructed by the third party which may subsequently be executed by the discovery application. Enabling third party probes to be operable with the discovery application may also be accomplished in any appropriate manner, such as providing an interface associated with the discovery application that third parties may conform their probes to so that the third-party probes may be executable by the discovery application. Third-party probes as referenced herein may include probes that are just constructed separately from the discovery application, and not necessarily by a third-party separate from the discovery application. For example, the discovery application may be configured to execute probes according to a prioritized discovery plan, but does not itself construct the probes. Instead, the probes may be constructed elsewhere, such as manually by a user or by a separate application, and then associated with the discovery application to be executed, such as by being loaded into the discovery application.

After the probes transmit the requests to the active addresses on the network, the devices located at the active addresses may process the requests and generate a corresponding response, which may then be received by the probes. While it may be the case that a response is received from every active address, it may also be the case that responses are only received from some subset of the active addresses, which may be due to several reasons. In some cases, this may simply be because requests were only transmitted to a subset of the active addresses, as step 320 may have been executed for a later tier in the prioritized discovery plan which only resulted in requests being transmitted to the remaining active addresses where the device located at those addresses had yet to be identified. Alternatively, it may be the case that the requests were not successfully transmitted to some of the active addresses. Since those active addresses, and thus the devices at those addresses, may have never received a request, there would not have been anything for them to respond to. However, for the responses that are received, various embodiments of the discovery application may display those responses on a user interface as necessary. The responses may also be buffered until all of the responses have been received before all the responses are displayed simultaneously, or the responses may be displayed on the user interface as they are received. To determine when all responses have been received and limit the time spent waiting for responses from addresses that may never provide a response, a threshold amount of time may be imposed such that the threshold amount of time elapsing after receiving a response without receiving any additional responses indicates when all responses have been received. Alternatively, the threshold amount of time may indicate the total amount of time to wait for responses after all the requests have been transmitted. It may also be noted that the entire threshold amount of time may not need to elapse as a response being received from each of the active addresses that a request was transmitted to at step 320 may also indicate that all responses have been received.

After the responses to the targeted requests have been received, at step 330, the discovery application may identify various devices connected to the network based on those responses. Although the structure and contents of the responses may vary depending on the communication protocol that the devices used to transmit the responses, the devices may still be identified directly from the response in some cases as the response may include various identifying information for the device. For example, if the response includes information like a device's vendor and model, extracting that information from the response may be sufficient in some cases to identify the device associated with a specific active address on the network.

Example Response
BACnet response:
{
"bacnet.location":string"72 Gatehouse'Flr_01",
"bacnet.vendorID":string"7",
"service.address":string"172.16.222.83",
"bacnet.modelName":string"DXR2.E12PX-1",
"bacnet.instanceID":string"216213",
"bacnet.objectName":string"P740501VAV",
"bacnet.vendorName":string"Siemens Building Technologies",
"service.transport":string"udp",
"bacnet.description":string"RECEPTION",
"bacnet.vendorIDLookup":string"Siemens Schweiz AG (Formerly: Landis & Staefa Division Europe)",
"bacnet.firmwareRevision":string"FW=01.21.29.104; WPC=1.4.130;SVS-300.1:SBC=13.21;",
"bacnet.softwareRevision":string"AAS-20: AP=14023_VAV_DXR2E12PX_15001.3.001; SU=UsUn;APT=HvacLgtShd12_A;AP TV=3.001;"
}

An example response that may be received from a device located at an address on the network is shown. The example response may be shown in a JSON format, but this may be the result of processing the raw response from the device, which may have been in a format corresponding to the BACnet communication protocol used by the device. In various embodiments, the example response may be one generated in response to a request transmitted by a BACnet probe corresponding to the example probe configuration settings shown above. The response may include various types of information that may be used to identify the device, with some examples shown in the example response and described below. The "bacnet.location" may represent the address information that the BACnet protocol uses to route requests to different locations on a network. The "bacnet.vendorID" may be an identifier for the vendor that manufactured the device which generated the example response. The "service.address" may be the identifier for the network address which the example response was received from. The "bacnet.modelName" may be text for the specific model of the device that generated the example response. The "bacnet.instanceID" may be the device's instance ID that uniquely identifies the device and distinguishes it from the other devices that may be connected to the network. The "bacnet.objectName" may be the device's serial number assigned by the vendor. The "bacnet.vendorName" may be the formal name for the vendor that manufactured the device. The "service.transport" may be the transport layer protocol used to transmit the response. The "bacnet.description" may be textual data for describing various other aspects of the device or the response itself. The "bacnet.vendorIDLookup" may be textual data that may be used as in a search query to retrieve additional information on the device's vendor. The "bacnet.firmwareRevision" may be the current firmware version of the device, while the "bacnet.softwareRevision" may be the current software version of the device.

However, in other cases, it may be that the necessary information to identify the device located at an active address is not readily available from the response received from that address. Instead, the response may only include various data components that do not provide sufficient identifying information by themselves. As such, it may be necessary to perform additional processing on the responses. For example, the responses may include various strings of text that may operate as search terms to locate and retrieve the corresponding identifying information for a device from a data source which stores the identifying information for various devices that are or may be located on the network. The data source may be any appropriate medium for storing data, such as a database or a directory, and the identifying information for devices may be stored in any appropriate manner. For example, if the data source is a database, the identifying information may be stored as records where the attributes correspond to various components of identifying information. If the data source is a directory, the identifying information may be stored as specially formatted profiles where the contents of the profiles include the various components of identifying information for different devices. In order to locate the corresponding record in the data source, the responses, or certain data that may be parsed from the responses, may be matched against the contents of the data source. This may include comparing a specific attribute or set of attributes for a record in a database to some aspect of the responses (such as the instanceID of the example BACnet response), or comparing various parts of the responses to text patterns or other identifiers that are used to represent different profiles in a data directory.

In cases where the devices' identifying information may be stored as profiles in a data directory, a subset of relevant profiles may be determined first so that the entire data directory may not need to be searched when comparing the response or parts of the response, which may provide performance optimizations for step 330. The subset of relevant profiles may be determined in various manners, such as being based on the probes specified for a given tier. For example, the probes in a given tier may correspond with certain communication protocols. Various devices may be known beforehand to communicate using those protocols corresponding to the probes in the given tier, and thus the device profiles that may be relevant for this tier may be those known to communicate using those protocols corresponding to the probes. The profiles may also be determined based on the port numbers specified in a given tier. For example, if probes in a given tier transmit requests to port 80 but not port 9980, the relevant profiles may then be those associated with port 80 but not port 9980. However, these processing methods are only examples, and many other approaches may be appropriate when identifying devices based on the responses.

After various devices have been identified, at step 340, the addresses corresponding to those identified devices may be removed from the set of active addresses on the network. Since the devices located at various addresses may have been identified in step 330 based on the responses received from those addresses, subsequent tiers of probes may not need to transmit additional requests to those addresses, which may be achieved by removing those addresses from the set of active addresses. When the flow of method 300 returns back to step 320 for the next tier in the prioritized discovery plan, the probes in the next tier may transmit requests to all the active addresses on the network, but because the addresses for identified devices may be removed from that set, no additional requests may be transmitted to those addresses as a result. Although the flow of method 300 may return back to step 320 after step 340, the method 300 may also terminate after step 340 if a particular iteration corresponds with the last tier in the prioritized discovery plan. It may be noted, however, that not every iteration of step 340 may result in addresses being removed from the set of active addresses. For example, in cases where the first tier of the prioritized discovery plan includes broadcasting requests to all the addresses to discover which addresses have devices located at them, it may be that every address is an active address, and thus no addresses may be removed.

Figure 4A:
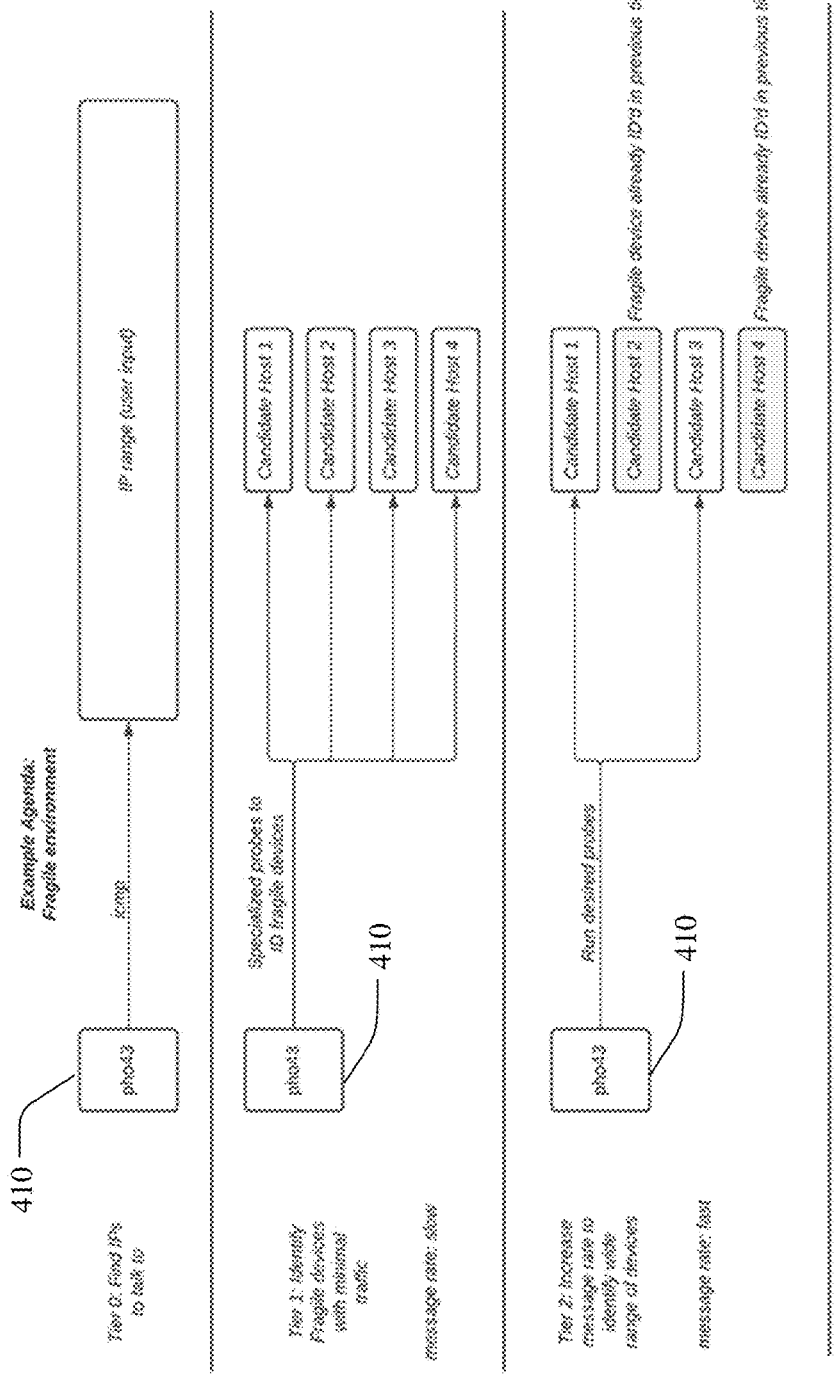
FIG. 4A illustrates a schematic of the device identification process that a discovery application may execute.

FIG. 4A illustrates a schematic 400 of the device identification process that a discovery application may execute, such as in accordance with method 300. The discovery application 410 may proceed using a prioritized discovery plan as described thus far, where the first tier of probes may be directed to determining the active addresses on the network using a set of broadcasted requests. Specifically, the discovery application 410 may cause an ICMP probe to broadcast requests to an IP range specified by user input, where the IP range may include all the potential IP addresses on a network and is the range of addresses from which the active addresses may be determined. Once the active addresses have been determined, the discovery application 410 may cause specialized probes to transmit requests to the active addresses to identify any fragile devices that may be connected to the network. In the schematic 400, the set of active addresses may include four addresses where there is a device located at each of those active addresses. The second tier of probes may thus only transmit requests to those four addresses in order to determine whether the devices located at those active addresses are fragile devices. Based on the responses to those requests from the specialized probes, the discovery application 410 may determine that the second and fourth devices are fragile devices which should be excluded by subsequent tiers of probes. In various embodiments, the addresses associated with the second and fourth devices may then be removed from the set of active addresses such that subsequent tiers of probes do not transmit additional probes to those addresses and fragile devices The discovery application 410 may then cause a third tier of desired probes to transmit additional requests to only the active addresses that the first and third devices are located at in order to identify them. The end result may be that the discovery application 410 identifies the first device as an HP device, the second and fourth devices as a Siemens programmable logic controllers (PLC), and the third device as an AXIS camera. In various embodiments, the schematic 400 may also be analogous to the example device identification process described with respect to FIGS. 2A-2F, even though the particular devices identified may differ.

Figure 4B:
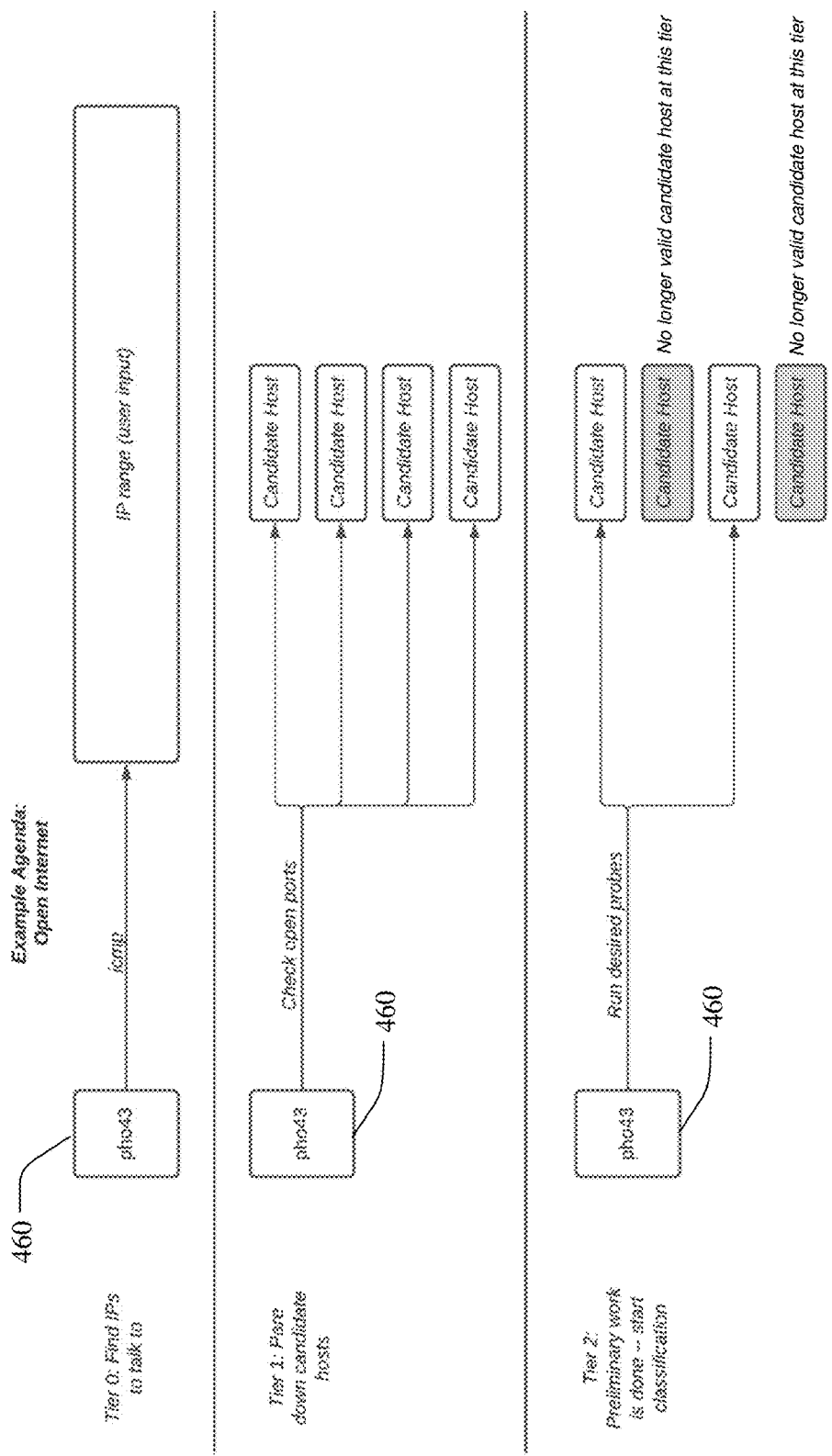
FIG. 4B illustrates another schematic of the device identification process that a discovery application may execute.

FIG. 4B illustrates another schematic 450 of the device identification process that a discovery application may execute. This device identification process may begin similarly to that of schematic 400, where the discovery application 460 may cause a first tier of probes to broadcast requests to all the addresses on a network in order to determine the set of active addresses. Specifically, the discovery application 460 may cause an ICMP probe to broadcast requests to all the addresses in an IP range that was provided through user input. Once the active addresses have been determined, the discovery application 460 may cause a second tier of probes to transmit requests in order to pare down some of the devices located at the active addresses. Specifically, the discovery application may cause the second tier of probes to transmit requests in order to check which ports may be open at the various devices on the network. The discovery application may then use the information about the open ports to identify some of the devices on the network. The discovery application may also use information about certain ports being closed to identify some devices, as only certain devices may have certain ports closed, or to determine that those devices are part of an excluded category of devices which subsequent tiers of probes should not transmit additional requests to. Based on the responses received for the requests transmitted by the second tier of probes, the discovery application may determine that the devices located at the second and fourth active addresses are to be excluded from subsequent tiers of probes, whether it be because those devices were identified or determined to be part of an excluded category of devices. Once the devices have been pared down, the discovery application may cause a third tier of desired probes to transmit requests to only the first and third active addresses, as they may still be valid targets for identification. In various embodiments, the identification process of the schematic 450 may correspond to the example prioritized discovery plan described above, where the schematic 450 may result from the discovery application executing that example plan.

Figure 5:
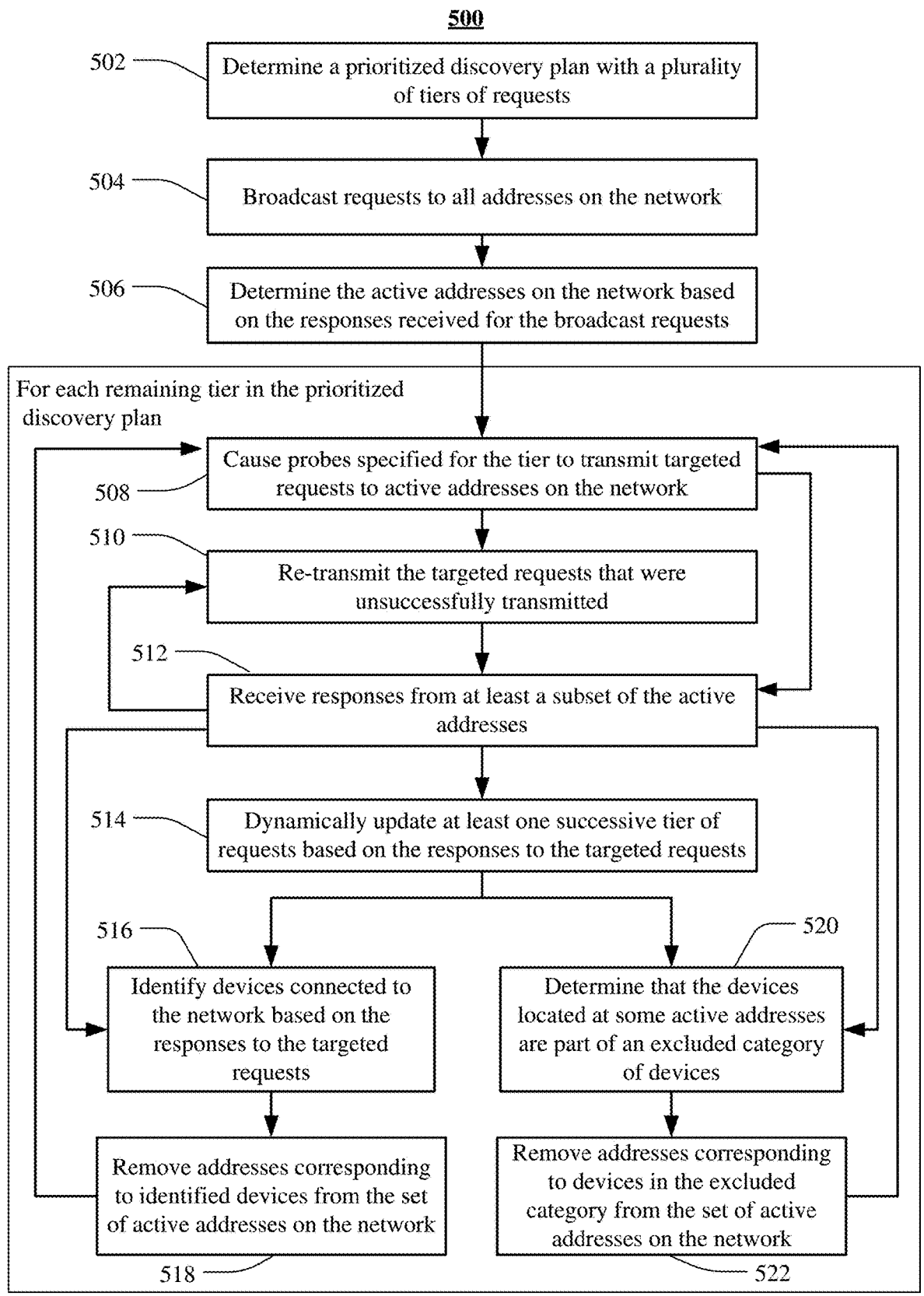
FIG. 5 illustrates a more detailed method for identifying devices on a network.

While a general method for identifying devices on a network was described above with respect to FIG. 3, various embodiments may include additional steps, some of which have been described herein, but many other additional steps may also be appropriate. To that end, FIG. 5 illustrates a more detailed method 500 for identifying devices on a network. The method 500 may be executed by a discovery application and may begin at step 502, where a prioritized discovery plan with a plurality of tiers of requests may be determined. In various embodiments, step 502 of method 500 may correspond to step 310 of method 300. As described above with respect to step 310 of method 300, the prioritized discovery plan may include various tiers of requests to be transmitted by various probes where the tiers may be organized according to various prioritization characteristics, such as later tiers including probes that transmit requests using less common communication protocols compared to the probes in earlier tiers. The prioritized discovery plan may also be determined in various ways and may include a set of transmission settings that control various aspects of how probes transmit requests to addresses on the network.

The first tier of the prioritized discovery plan may include probes which broadcast requests to all the addresses on the network in order to discover the active addresses that have a device located at them. As a result, at step 504, the discovery application may broadcast requests to all the addresses on the network in accordance with the prioritized discovery plan. The devices located at the various addresses may then generate a corresponding response after receiving the broadcasted requests, and the discovery application may then use those responses at step 506 in order to determine the set of active addresses on the network. In various embodiments, steps 504 and 506 of method 500 may also correspond to step 310 of method 300.

Once the set of active addresses have been determined, the remainder of the steps 508-522 in method 500 may be executed for each of the remaining tiers in the prioritized discovery plan. It may be noted that method 500 may only execute the steps 508-522 for the remainder of the tiers in the plan whereas method 300 may execute the steps 320-340 for each tier in the prioritized discovery plan. This may be the case as the first tier in the prioritized discovery plan of method 500 may be used for broadcasting requests to all the addresses on the network to determine the set of active addresses, something which may not be included in method 300.

At each iteration of step 508, the discovery application may cause the probes specified for a given tier to transmit targeted requests to the active addresses on the network. In various embodiments, step 508 may correspond to step 320 of method 300. As mentioned earlier with respect to step 320 of method 300, the probes in step 508 may transmit the requests as either multicast or unicast. The discovery application may also monitor the transmission process to ensure compliance with the transmission settings. In various embodiments, once the probes transmit the requests in step 508, method 500 may proceed to step 512 where responses may be received from at least a subset of the active addresses which requests were transmitted to. However, in various other embodiments, method 500 may first proceed to step 510 to re-transmit the targeted requests that were unsuccessfully transmitted at step 508.

In some cases, it may be possible that the packets for some of the requests transmitted by probes in step 508 are lost on the way to the addresses, resulting in unsuccessful transmissions of those requests. This may result from various factors, such as the protocol that various probes may use to transmit the requests, or the manner in which the requests are transmitted. In various embodiments, this particular detail may be insignificant and thus ignored as any address that does not generate a response may be treated as an empty address without a corresponding device. In other words, various embodiments may not differentiate between reasons for a lack of response, regardless of whether it was because the request was transmitted to an empty address with no corresponding device or because the request was never successfully transmitted to the address. This approach may be acceptable in such embodiments as the proportion of unsuccessfully transmitted requests may be miniscule enough that it does not pose enough of an impact on the overall objective behind the device identification process. For example, if the original objective was to identify devices in order to get an overall sense of the type of devices on the network, failing to identify some devices due to failed request transmissions may not make too big of a difference. Consequently, various embodiments may proceed directly from the probes transmitting the requests at step 508 to receiving responses for the requests at step 512.

However, in various other embodiments, requests that are unsuccessfully transmitted at step 508 may need to be specifically handled to ensure requests are transmitted to all intended addresses in order to identify as many devices as possible. This approach may be necessary in cases where it may be important to be aware of every device on the network and not identifying devices may pose a significant enough effect to the original objective behind the device identification process that failed requests may not be ignored. For example, if the original objective was to identify devices in order to monitor devices for any potential abnormalities, failing to identify devices and thus being unable to monitor some devices may lead to significant consequences. To minimize the chances that devices fail to be identified due to requests transmitted at step 508 failing to reach some addresses, the discovery application executing method 500 may re-transmit the requests that failed to be transmitted to their intended addresses. Various approaches may be taken to that end. For example, once a request has been transmitted to an address, the amount of time since the transmission may be tracked. If a response is not received from that address after some timeout threshold, that may be an indication that the request failed to arrive at the address. Another request, which may be a copy of the previously transmitted request, may then be transmitted to that same address, with this process potentially being repeated more than once. As a result, the flow of method 500 may also return from step 512 back to step 510, as requests may be re-transmitted after receiving responses from some of the active addresses and subsequently determining from the responses that some requests had been transmitted unsuccessfully. Additionally, the timeout threshold may also be included as a parameter in the transmission settings of the prioritized discovery plan.

In the process of re-transmitting requests, it may also be necessary to impose some limit to the frequency which requests are re-transmitted. Because there may not be a device at some addresses, no response may be received from those addresses regardless of the number of requests that are transmitted to them. As such, a limit for the maximum number of times to re-transmit any particular request may need to be imposed. The maximum number of re-transmissions may be raised or lowered depending on the level of assurance required in various embodiments that no response from an address corresponds to no device being located at that address. Specifically, higher limits may increase the assurance that no device is located at that address since it becomes less and less likely that the lack of a response is due to successive failures of all the re-transmitted requests failing to arrive at the address. Similar to the timeout threshold discussed above, this limit for the number of time to re-transmit a given request may also be included as part of the transmission settings in the prioritized discovery plan.

Once the requests have been transmitted at step 508, and optionally re-transmitted as necessary in step 510, the discovery application executing method 500 may receive responses from at least a subset of the active addresses. Various embodiments of method 500 may then skip 514 and proceed directly to step 516 to identify the devices connected to the network based on the responses or step 520 to determine that some of the devices located at the active addresses are part of an excluded category of devices, which are described further below. However, various other embodiments may instead proceed to step 514 to dynamically update at least one successive tier of the prioritized discovery plan based on the responses to the targeted requests that were received at step 512. Various embodiments may also decide to dynamically update the prioritized discovery plan for a variety of reasons. For example, the discovery plan may be updated in order to further optimize the performance of the discovery application when executing the plan. Alternatively, the responses received at step 512 may provide additional information about the network that was not known at the beginning when the original prioritized discovery plan was determined, resulting in changes to the plan.

---
Example prioritized discovery plan before being updated
---

```
{
  "description": "Tier 0: IP",
  "probes": [
    { "name": "icmp" }
  ]
},
{
  "description": "Tier 1: Identify additional open ports"
  "probes": [
    {
      "name": "udp",
      "udp_ports": [161, 1900, 3702, 5353]
    },
    {
      "name": "tcp",
      "tcp_ports": [80, 8000, 8080],
      "tls_ports": [443, 8443]
    }
  ]
},
{
  "description": "Tier 2: Identify devices",
  "probes": [
    { "name": "http" ,
      "tcp_ports": [80, 8000, 8080],
      "tls_ports": [443, 8443]
    }
  ]
}
```

---
Example prioritized discovery plan after being updated
---

```
{
  "description": "Tier 0: IP",
  "probes": [
    { "name": "icmp" }
  ]
},
{
  "description": "Tier 1: Identify additional open ports",
  "probes": [
    {
      "name": "udp",
      "udp_ports": [161, 1900, 3702, 5353]
    },
    {
      "name": "tcp",
      "tcp_ports": [80, 8000, 8080],
      "tls_ports": [443, 8443]
    }
  ]
},
{
  "description": "Tier 2: Identify devices",
  "probes": [
    { "name": "http" ,
      "tcp_ports": [80, 8000, 8080],
      "tls_ports": [443, 8443]
    }
  ]
}
{
  "description": "Tier 3: Identify additional devices",
  "config": [
    {"field": "mdns_do_broadcast", "value": "false"}
    {"field": "mdns_do_unicast", "value": "true"},
    {"field": "mdns_service_types", "value": "_http._tcp,
_https._tcp, _rtsp._tcp, _ipp._tcp, _ipps._tcp,
_workstation._tcp, _smb._tcp, _ftp._tcp, _afpovertcp._tcp,
_daap._tcp, _qdiscover._tcp, _device-info._tcp, _printer._tcp,
_pdl-datastream._tcp, _telnet._tcp, _tftp._udp, _adisk._tcp,
_dns-sd._udp"},
    {"field": "upnp_do_broadcast", "value": "false"},
```

```
    {"field": "upnp_do_unicast", "value": "true"},
    {"field": "wsd_do_broadcast", "value": "false"},
    {"field": "wsd_do_unicast", "value": "true"}
  ],
  "probes": [
    { "name": "mdns" },
    { "name": "upnp" },
    { "name": "wsd" },
    { "name": "snmp" }
  ]
}
```

An example prioritized discovery plan before and after being updated is also included. This example discovery plan may include various similar components as the example discovery plan described earlier with respect to FIG. 3. The first tier of the example discovery plan may be directed to discovering the active addresses on the network and may include an ICMP probe. Once the active addresses have been determined, the second tier of the example discovery plan may be directed to identifying whether various devices are communicating through various more commonly used port numbers, but also whether any devices connected to the network may be communicating through some less commonly used port numbers. In the example discovery plan before being updated, the TCP and TLS port numbers may be more commonly used, but the UDP ports 161, 1900, 3702, and 5353 may be less commonly used. Assuming the UDP port numbers are less commonly used by devices to communicate through, few if any devices may be identified by transmitting requests to those port numbers, and thus the initial example prioritized discovery plan before being updated may not include probes that transmit requests to those port numbers. Instead, the third tier of the example discovery plan before being updated may only include probes that transmit requests to the more commonly used TCP and TLS port numbers. However, if responses received at step 512 of method 500 indicate that various devices are communicating through the less common UDP ports, the example discovery plan may be updated to include additional probes to transmit requests to those less common UDP ports. Specifically, and referring to the example prioritized discovery plan after being updated, the updated discovery plan may include a new fourth tier to identify the additional devices that may be communicating through the less common UDP ports. The fourth tier may thus include a variety of additional probes (i.e. MDNS, UPnP, WSD, and SNMP probes) to transmit requests to the devices communicating through the less commonly used ports. As a result, in this example, the information obtained from the responses to requests transmitted from an earlier tier may be used to update the discovery plan, such as to add additional probes. Although this example used certain UDP ports, the earlier tiers in various other prioritized discovery plans may also use many other ways to obtain information and decide whether additional tiers of probes should be added to the prioritized discovery plan, or whether any other type of update should be made, such as removing, combining, or altering later tiers. The prioritized discovery plan may also be updated more than one time. For example, a device located at an address may generate a response to a request transmitted from the MDNS probe, which itself may have been included as a result of an update to the prioritized discovery plan, with information that there is a FTP server executing on port 9932. The prioritized discovery plan may then be updated again to include another tier of TCP probes to transmit requests to port 9932 to identify the FTP server.

The method 500 may then proceed to either step 516, where the responses to the targeted requests received at step 512 may be used to identify the devices connected to the network, or step 520, where the responses to the targeted requests may be used to determine whether any devices are part of an excluded category of devices. If the flow of method 500 proceeds to step 516 to identify the devices connected to the network, the responses to the targeted requests may be analyzed in various way to identify the devices located at the addresses from which the responses were received. As described above with respect to step 330 of method 300, identifying the devices based on the responses may be achieved by extracting device identification data from the response or the response may be parsed and then compared against a data source with pre-existing information on possible devices connected to the network. However, additional processing may also be needed in various embodiments as part of identifying the devices.

In various other embodiments, even if the responses to the targeted requests do include device identification data that may be extracted or parsed and then compared against a data source, it may be the case that the responses are formatted in such a way that the contents are not readily accessible or usable. Consequently, it may be necessary in various embodiments to first process the responses before the responses may be used to identify the devices. There may be many different types of processing to perform depending on the structure of the responses or the way that the responses will subsequently be used. For example, one type of processing that may be needed is an aggregation across different sets of responses or across all of the responses, which may be necessary for a variety of reasons. One reason may be that the responses received from at least some of the addresses were divided into components which were transmitted separately. As a result, the separate components may need to be aggregated together to form a complete response before it may be used to identify the device located at the address that those response components were received from.

Another type of processing that may be performed is formatting or re-formatting the responses. The raw responses may already be in some format when they are received, but the manner in which the responses are used to identify the devices in step 516 may require the responses or the information in the responses to be in a different format. For example, if identifying the devices comprises retrieving identifying information from a database, the responses or various parts of the responses may need to be reformatted as a query that can be understood by the database. On the other hand, if identifying information is to be parsed from the response and then compared to a profile from a directory of profiles representing known devices, the responses may need to be transformed into a flattened form where all parts of a response are on single level so that the responses may be parsed. Although only two examples of additional processing for the responses are discussed, many other types of processing may be appropriate in various embodiments.

After devices have been identified based on the responses to the targeted requests, the addresses corresponding to the identified devices may be removed from the set of active addresses at step 518. This may be done to prevent subsequent tiers of probes from transmitting additional requests to those addresses after the devices located at those addresses have already been identified. This may be similar to step 340 of method 300 as described above, and in various embodiments, step 516 may correspond to step 330 of method 300 while step 518 may correspond to step 340 of method 300. The flow of method 500 may then transition from step 518 back to step 508 so that the next iteration of steps 508-518 may be performed for the next tier in the prioritized discovery plan, but the flow of method 500 may also terminate after step 518 if a given iteration corresponds to the last tier in the prioritized discovery plan.

If instead the flow of method 500 proceeds to step 520 after step 512 or 514, the discovery application may use the responses received at step 512 to determine whether the devices located at some active addresses are part of an excluded category of devices. This may include determining whether any devices are fragile devices or should otherwise be excluded, such as if the devices are servers or personal computers as described above with respect to FIG. 1. Determining that some devices are part of an excluded category of devices may also be done in the same or similar manner as how devices may be identified at step 516 or step 330 of method 300. Additionally, determining that the devices are part of an excluded category may also be achieved without fulling identifying the device. For example, the responses received at step 512 may indicate that some devices located at certain addresses are executing some service on a particular port that is known to be used by industrial control devices. As a result, the specific devices located at those addresses may not be identifiable from the responses, but those devices may nonetheless still be determined to be fragile devices and thus should be excluded. And similar to step 518, once devices have been determined to be part of an excluded category, the addresses corresponding to those devices may be removed from the set of active addresses at step 522 so that subsequent tiers of probes do not transmit additional requests to those addresses. The flow of method 500 may also transition from step 522 back to step 508 so that the next iteration of steps 508-522 may be performed for the next tier in the prioritized discovery plan, but the flow of method 500 may also terminate after step 522 if a given iteration corresponds to the last tier in the prioritized discovery plan.

Particular embodiments may repeat one or more steps of the methods of FIGS. 3 and 5, where appropriate. Although this disclosure describes and illustrates particular steps of the methods of FIGS. 3 and 5 as occurring in a particular order, this disclosure contemplates any suitable steps of the method of FIGS. 3 and 5 occurring in any suitable order. Moreover, although this disclosure describes and illustrates example methods for discovering devices on a network including the particular steps of the methods of FIGS. 3 and 5, this disclosure contemplates any suitable method for discovering devices on a network including any suitable steps, which may include all, some, or none of the steps of the methods of FIGS. 3 and 5, where appropriate. Furthermore, although this disclosure describes and illustrates particular components, devices, or systems carrying out particular steps of the methods of FIGS. 3 and 5, this disclosure contemplates any suitable combination of any suitable components, devices, or systems carrying out any suitable steps of the methods of FIGS. 3 and 5.

Figure 6:
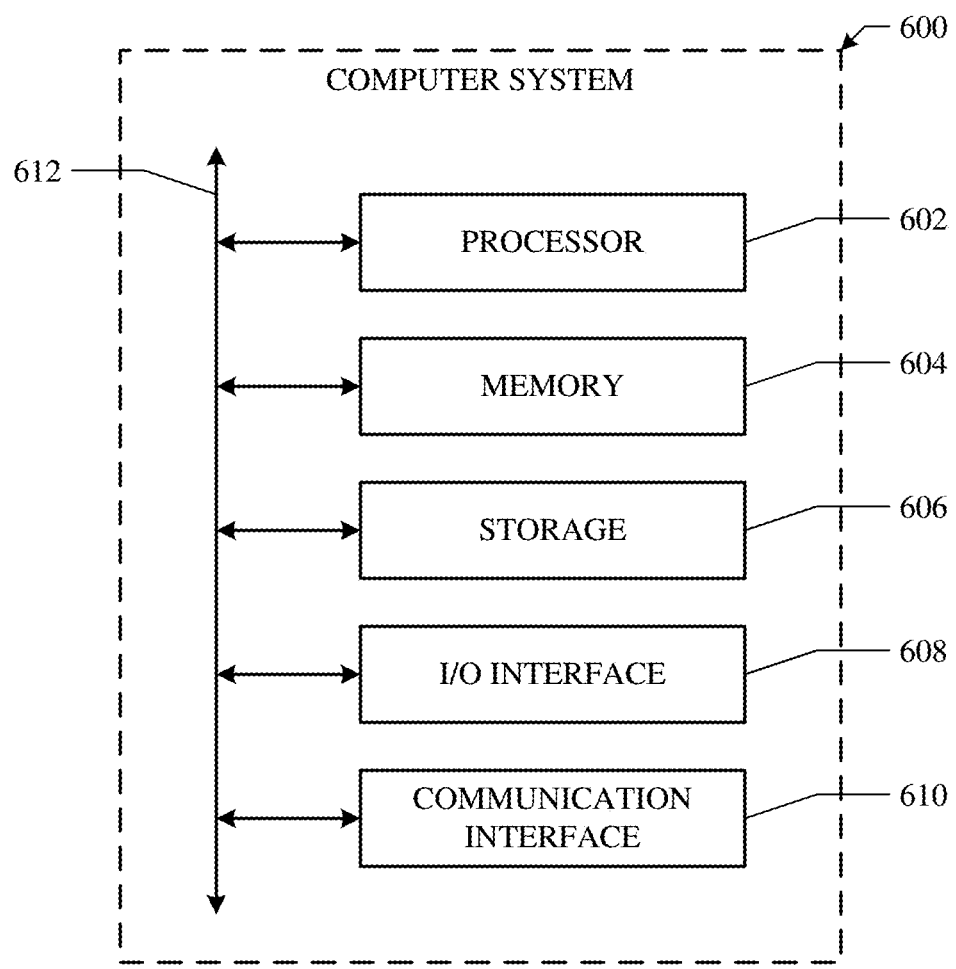
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The invention claimed is:

1. A method for identifying devices on a network, comprising:
  determining, by a discovery application executing on a computer, a prioritized discovery plan including a plurality of tiers of requests, each of the tiers specifying one or more probes for targeting specific types of devices, wherein the prioritized discovery plan further comprises transmission settings;

for each of the tiers in the prioritized discovery plan:
  causing, by the discovery application, one or more of the probes specified for the tier to transmit targeted requests to a set of active addresses on the network;
  upon receiving responses from at least a subset of the one or more addresses, identifying, by the discovery application, one or more devices connected to the network based on the responses to the targeted requests; and
  removing, by the discovery application, addresses corresponding to the identified one or more devices from the set of active addresses on the network.

2. The method of claim 1, wherein identifying the one or more devices comprises:
  determining a set of device profiles based on the probes specified for the tier;
  parsing data from the responses to the targeted requests; and
  comparing the parsed data to identifying information in the device profiles, wherein the one or more devices are identified based on the comparison.

3. The method of claim 1, wherein determining the prioritized discovery plan is based on user input specifying a network ID, one or more protocols, one or more ports for each of the protocols, one or more probes, information related to the transmission settings, device recognition settings, or a network context.

4. The method of claim 1, wherein the prioritized discovery plan comprises a first tier of broadcast requests for discovering active addresses on the network, and further comprising:
  broadcasting, in accordance with the prioritized discovery plan, requests to all candidate addresses on the network; and
  determining, based on one or more responses received from at least a subset of the addresses, the set of active addresses on the network.

5. The method of claim 1, wherein the prioritized discovery plan specifies that the one or more probes transmit the targeted requests corresponding to later tiers of the one or more successive tiers using less common communication protocols or to less common port numbers.

6. The method of claim 1, wherein the prioritized discovery plan defers execution of one or more of the probes that are classified as resource-intensive to later tiers of the one or more successive tiers.

7. The method of claim 1, further comprising:
  determining, based on responses received for at least one previous tier of requests, that a device connected to the network is fragile or excluded; and
  removing an address corresponding to the fragile or excluded device from the set of active addresses.

8. The method of claim 1, wherein at least one of the one or more tiers of requests are transmitted in accordance with transmission settings configured for the tier or for one of the probes specified for the tier, wherein the transmission settings for the tier are configured to maximize speed of discovery while avoiding triggering alerts, or wherein the transmission settings for the probe are configured to maximize speed of discovery while avoiding device faults.

9. The method of claim 1, wherein at least one of the successive tiers of requests is dynamically updated based on responses received for at least one previous tier of requests.

10. The method of claim 1, wherein identifying the devices comprises extracting identifying information on the one or more devices from the responses to the targeted requests.

11. The method of claim 1, wherein the transmission settings comprise a time threshold for resending a request or a maximum number of times to resend a request.

12. The method of claim 1, wherein the one or more probes comprise at least one third-party probe conforming to an interface associated with the discovery application.

13. A system comprising one or more processors and a memory coupled to the processors comprising instructions executable by the processors for identifying devices on a network, the processors being operable when executing the instructions to:
  determine, by a discovery application, a prioritized discovery plan including a plurality of tiers of requests, each of the tiers specifying one or more probes for targeting specific types of devices, wherein the prioritized discovery plan further comprises transmission settings;
  for each of the tiers in the prioritized discovery plan:
    cause, by the discovery application, one or more of the probes specified for the tier to transmit targeted requests to a set of active addresses on the network;
    upon receiving responses from at least a subset of the one or more addresses, identify, by the discovery application, one or more devices connected to the network based on the responses to the targeted requests; and
    remove, by the discovery application, addresses corresponding to the identified one or more devices from the set of active addresses on the network.

14. The system of claim 13, wherein identifying the one or more devices comprises:
  determining a set of device profiles based on the probes specified for the tier;
  parsing data from the responses to the targeted requests; and
  comparing the parsed data to identifying information in the device profiles, wherein the one or more devices are identified based on the comparison.

15. The system of claim 13, wherein determining the prioritized discovery plan is based on user input specifying a network ID, one or more protocols, one or more ports for each of the protocols, one or more probes, information related to the transmission settings, device recognition settings, or a network context.

16. The system of claim 13, wherein the prioritized discovery plan comprises a first tier of broadcast requests for discovering active addresses on the network, and wherein the processors being further operable when executing the instructions to:
  broadcast, in accordance with the prioritized discovery plan, requests to all candidate addresses on the network; and
  determine, based on one or more responses received from at least a subset of the addresses, the set of active addresses on the network.

17. One or more computer-readable non-transitory storage media embodying software for identifying devices on a network, the software comprising instructions operable when executed to:
  determine, by a discovery application, a prioritized discovery plan including a plurality of tiers of requests, each of the tiers specifying one or more probes for targeting specific types of devices, wherein the prioritized discovery plan further comprises transmission settings;
  for each of the tiers in the prioritized discovery plan:
    cause, by the discovery application, one or more of the probes specified for the tier to transmit targeted requests to a set of active addresses on the network;

upon receiving responses from at least a subset of the one or more addresses, identify, by the discovery application, one or more devices connected to the network based on the responses to the targeted requests; and remove, by the discovery application, addresses corresponding to the identified one or more devices from the set of active addresses on the network.

18. The non-transitory storage media of claim 17, wherein identifying the one or more devices comprises:

determining a set of device profiles based on the probes specified for the tier;

parsing data from the responses to the targeted requests; and comparing the parsed data to identifying information in the device profiles, wherein the one or more devices are identified based on the comparison.

19. The non-transitory storage media of claim 17, wherein determining the prioritized discovery plan is based on user input specifying a network ID, one or more protocols, one or more ports for each of the protocols, one or more probes, information related to the transmission settings, device recognition settings, or a network context.

20. The non-transitory storage media of claim 17, wherein the prioritized discovery plan comprises a first tier of broadcast requests for discovering active addresses on the network, and wherein the instructions are further operable when executed to:

broadcast, in accordance with the prioritized discovery plan, requests to all candidate addresses on the network; and determine, based on one or more responses received from at least a subset of the addresses, the set of active addresses on the network.

* * * * *